US012595199B2

(12) United States Patent
Kiner

(10) Patent No.: US 12,595,199 B2
(45) Date of Patent: Apr. 7, 2026

(54) ROTATING BIOLOGICAL CONTACTOR MEDIA AND SHAFT/LOAD TRANSFER MECHANISM

(71) Applicant: James Robert Kiner, Clarkston, MI (US)

(72) Inventor: James Robert Kiner, Clarkston, MI (US)

(*) Notice: Subject to any disclaimer, the term of this patent is extended or adjusted under 35 U.S.C. 154(b) by 378 days.

(21) Appl. No.: 18/139,555

(22) Filed: Apr. 26, 2023

(65) Prior Publication Data

US 2023/0339792 A1      Oct. 26, 2023

Related U.S. Application Data

(60) Provisional application No. 63/334,798, filed on Apr. 26, 2022.

(51) Int. Cl.
*C02F 3/08* (2023.01)

(52) U.S. Cl.
CPC ........ *C02F 3/082* (2013.01); *C02F 2203/006* (2013.01)

(58) Field of Classification Search
CPC ...... C02F 3/082; C02F 2203/006; C02F 1/32; C02F 1/40; C02F 2301/024; Y02W 10/10
USPC ....................................................... 210/150
See application file for complete search history.

(56) References Cited

U.S. PATENT DOCUMENTS

| | | | |
|---|---|---|---|
| 4,729,828 A | 3/1988 | Miller | |
| 4,737,278 A | 4/1988 | Miller | |
| 5,227,055 A | 7/1993 | Timmons | |
| 5,281,335 A | 1/1994 | Kuhn | |
| 5,326,459 A | 7/1994 | Hlavach | |
| 5,395,529 A | 3/1995 | Butler | |
| 5,401,398 A | 3/1995 | McManus | |
| 5,407,578 A | 4/1995 | Nathwani | |
| 5,419,831 A | 5/1995 | Fuerst | |
| 5,423,978 A | 6/1995 | Snyder | |
| 5,458,817 A | 10/1995 | Lang | |
| 5,498,376 A | 3/1996 | St. Louis | |
| 5,637,263 A | 6/1997 | Lang | |
| 5,679,253 A | 10/1997 | Fuerst | |

(Continued)

FOREIGN PATENT DOCUMENTS

| | | | | |
|---|---|---|---|---|
| JP | 02115009 A | * | 4/1990 | ............. B01D 29/39 |
| KR | 900003060 Y1 | * | 4/1990 | ................ C02F 3/08 |

(Continued)

OTHER PUBLICATIONS

Translation of Nobuhiko (JP 2-115009) (Year: 1990).*

*Primary Examiner* — Ekandra S. Miller-Cruz
(74) *Attorney, Agent, or Firm* — William H. Honaker; Dickinson Wright PLLC

(57) ABSTRACT

A rotating biological contactor apparatus includes: a biozone tank containing a liquid being treated; a drive shaft driven to rotate; and at least one media disk. The media disk includes: a substrate having a disk shape defining a first surface and a second surface opposite the first surface, the substrate configured to be attached to the drive shaft and to rotate therewith; and a plurality of fins protruding from at least one of the first surface and the second surface of the substrate and extending for a length in a radial direction to generate a turbulent flow as the plurality of fins pass through a surface of the liquid being treated as the media disk rotates.

14 Claims, 21 Drawing Sheets

(56)                References Cited

U.S. PATENT DOCUMENTS

| | | | |
|---|---|---|---|
| 5,714,097 | A | 2/1998 | St. Louis |
| 5,851,636 | A | 12/1998 | Lang |
| 5,853,591 | A | 12/1998 | Snyder |
| 6,007,605 | A * | 12/1999 | Davila .................. B01D 33/275 |
| | | | 55/467 |
| 6,071,593 | A | 6/2000 | Lang |
| 6,241,222 | B1 | 6/2001 | Lang |
| 6,403,366 | B1 | 6/2002 | Kim |
| 6,508,631 | B1 * | 1/2003 | Smith .................... F04D 17/168 |
| | | | 417/44.2 |
| 6,540,920 | B2 | 4/2003 | Bounds |
| 6,783,669 | B1 | 8/2004 | Okagawa |
| 7,083,720 | B2 | 8/2006 | Miller |
| 7,156,986 | B2 | 1/2007 | Warrow |
| 7,276,155 | B1 | 10/2007 | Ricketts |
| 7,811,449 | B2 | 10/2010 | Warrow |
| 8,460,548 | B2 | 6/2013 | Baxi |
| 8,685,235 | B2 | 4/2014 | Kolesnikov |
| 9,133,042 | B2 | 9/2015 | Baxi |
| 9,783,438 | B2 | 10/2017 | Whiteman |
| 2002/0068676 | A1 * | 6/2002 | Collier ...................... B04B 1/04 |
| | | | 494/37 |
| 2005/0133444 | A1 | 6/2005 | Warrow |
| 2007/0231219 | A1 | 10/2007 | Warrow |
| 2008/0053880 | A1 | 3/2008 | Miller |
| 2008/0210610 | A1 | 9/2008 | Whiteman |
| 2009/0250386 | A1 | 10/2009 | Mayrand |
| 2010/0282654 | A1 | 11/2010 | Hauschild |
| 2012/0152833 | A1 | 6/2012 | Baxi |

FOREIGN PATENT DOCUMENTS

| | | | | |
|---|---|---|---|---|
| WO | 2013130947 | A2 | 9/2013 | |
| WO | WO-2015166125 | A1 * | 11/2015 | ............. B01J 19/30 |
| WO | 2016077715 | A1 | 5/2016 | |

* cited by examiner

Laminar Flow

Turbulent Flow

ROTATING BIOLOGICAL CONTACTOR MEDIA AND SHAFT/LOAD TRANSFER MECHANISM

CROSS REFERENCE TO RELATED APPLICATIONS

This U.S. utility patent application claims the benefit of U.S. Provisional Patent Application No. 63/334,798 filed Apr. 26, 2022, the contents of which is incorporated herein by reference in its entirety.

BACKGROUND OF THE INVENTION

1. Field of the Invention

The present disclosure relates generally to a Rotating Biological Contactor (RBC) for wastewater treatment.

2. Related Art

A wastewater treatment system using a Rotating Biological Contactor (RBC) system may include a tank or a series of tanks which receives and flows incoming wastewater through a treatment process. The RBC system includes media that is partially submerged in the tanks to progressively treat the wastewater to reduce an amount of organic material in the wastewater. The media provides an attachment point for a microbe biomass that, during its lifecycle, consumes the organic waste in the wastewater, thereby cleaning the wastewater. RBC systems may include a powered drive shaft with media disk assemblies attached thereto.

RBCS, including fixed film technology may be used as a secondary process in the treatment of municipal wastewater. Generally recognized advantages of RBC are its low energy use, process stability with load variations, low solids, more reliable liquid/solids separation, easy to operate, with additional direct and indirect advantages.

The RBC process flow, by its nature, follows a pattern that all system designs follow during the secondary treatment of wastewater. There are numerous variations of the RBC Train based on mechanical designs of the drive shaft and load transfer mechanisms, media designs and their design/performance objectives, power sources, power and drive designs and methods, and system controls to rotate the drive shaft and media disks.

SUMMARY OF THE INVENTION

The present disclosure provides a media disk for a rotating biological contactor apparatus. The media disk includes a substrate having a disk shape defining a first surface and a second surface opposite the first surface, the substrate configured to be attached to a drive shaft and to rotate therewith. The media disk also includes a plurality of fins protruding from at least one of the first surface and the second surface of the substrate and extending for a length in a radial direction to generate a turbulent flow as the plurality of fins pass through a liquid surface as the media disk rotates.

In some embodiments, the at least one of the first surface and the second surface of the substrate is flat.

In some embodiments, the at least one of the first surface and the second surface of the substrate is corrugated.

In some embodiments, the plurality of fins are integrally molded with the substrate.

In some embodiments, the plurality of fins each define an arcuate cross-section, with ends thereof configured to enter the liquid surface before a central portion thereof.

In some embodiments, the plurality of fins each define a substantially constant cross-section along a height direction generally perpendicular to the at least one of the first surface and the second surface of the substrate.

In some embodiments, the plurality of fins are arranged in a plurality of concentric rings on the at least one of the first surface and the second surface of the substrate.

In some embodiments, the plurality of fins protrude from both of the first surface and the second surface of the substrate.

In some embodiments, the media disk further includes a grommet protruding from the substrate and beyond a height of the plurality of fins, the grommet configured to provide an even spacing between the media disk and a next adjacent disk attached to the drive shaft.

In some embodiments, the grommet has a tubular shape for receiving a load transfer rod therethrough.

In some embodiments, the media disk further includes a plurality of media segments disposed annularly about the substrate and attached to rotate therewith.

In some embodiments, at least one of the media segments or the substrate defines a recess configured to receive a tab of another one of the media segments or the substrate for interconnecting the media segments with one another and with the substrate.

In some embodiments, the plurality of media segments includes: a plurality of first media segments disposed annularly about and adjacent to a peripheral edge of the substrate; and a plurality of second media segments disposed annularly about the plurality of first media segments.

The present disclosure also provides a rotating biological contactor apparatus. The system includes a biozone tank containing a liquid being treated, a drive shaft that is driven to rotate, and at least one media disk. The media disk includes a substrate having a disk shape defining a first surface and a second surface opposite the first surface, the substrate configured to be attached to the drive shaft and to rotate therewith. The media disk also includes a plurality of fins protruding from at least one of the first surface and the second surface of the substrate and extending for a length in a radial direction to generate a turbulent flow as the plurality of fins pass through a surface of the liquid being treated as the media disk rotates.

In some embodiments, the biozone tank includes a plurality of subsections separated by partitions. In some embodiments, the rotating biological contactor apparatus further comprises a plurality of media groups including a media group disposed at least partially within each subsection of the plurality of subsections, each media group of the plurality of media groups including one or more of the at least one media disk.

In some embodiments, the at least one media disk includes a plurality of media disks disposed parallel to one another.

In some embodiments, the plurality of fins are integrally molded with the substrate.

In some embodiments, the plurality of fins each define an arcuate cross-section, with ends thereof configured to enter the surface of the liquid being treated before a central portion thereof.

In some embodiments, the rotating biological contactor apparatus further includes a plurality of media segments disposed annularly about the substrate of the at least one media disk and attached to rotate therewith.

In some embodiments, at least one of the media segments or the substrate defines a recess configured to receive a tab of another one of the media segments or the substrate for interconnecting the media segments with one another and with the substrate.

BRIEF DESCRIPTION OF THE DRAWINGS

Further details, features and advantages of designs of the invention result from the following description of embodiment examples in reference to the associated drawings.

DESCRIPTION OF THE ENABLING EMBODIMENTS

Figure 1:
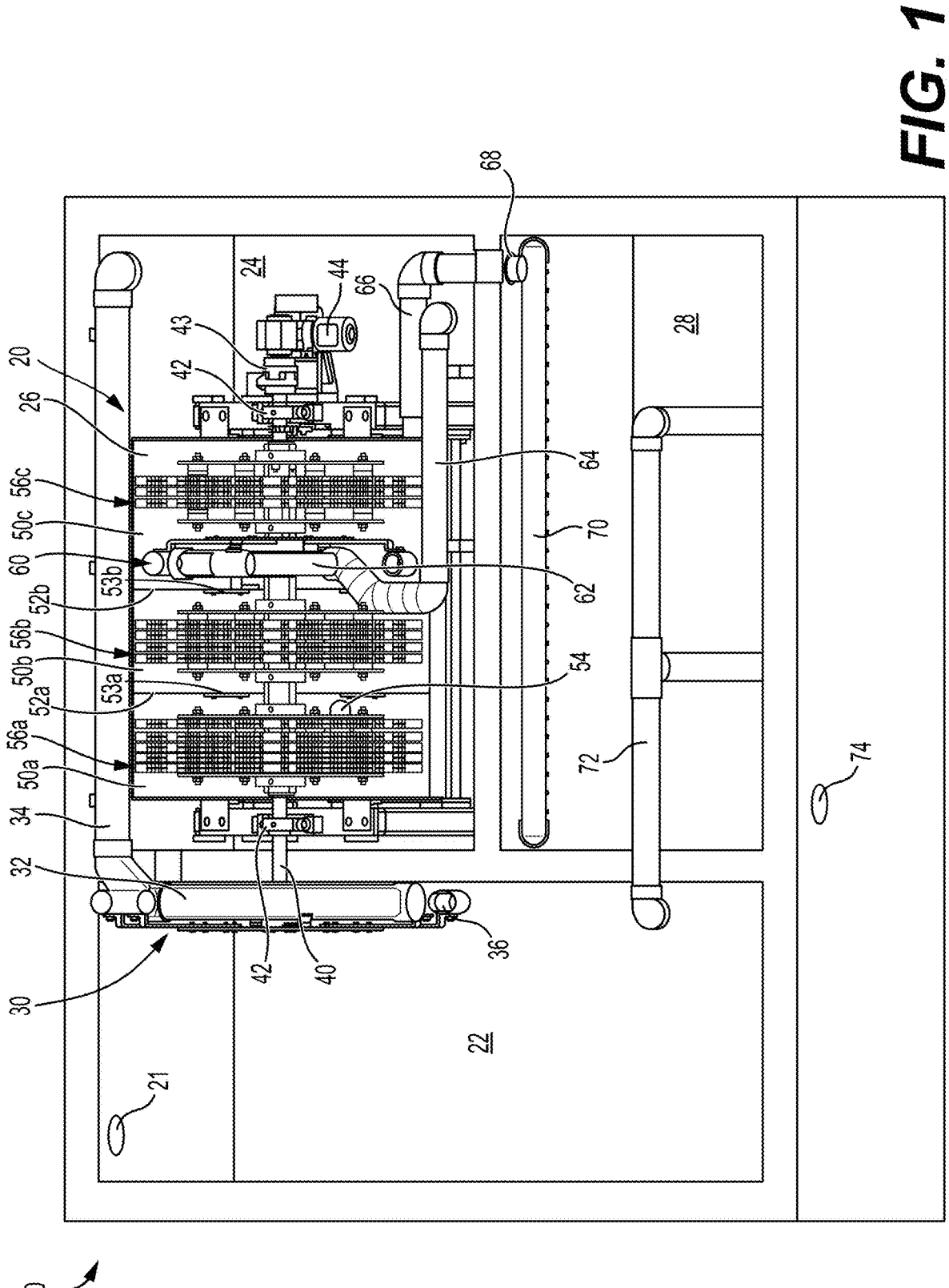
FIG. 1 shows a top view of a wastewater treatment system including a rotating biological contactor apparatus, in accordance with the present disclosure.

Referring to the drawings, the present invention will be described in detail in view of following embodiments.

The present disclosure relates generally to rotating biological contactors (RBCs) used in the field of municipal wastewater treatment, and more particularly, to the use of the media design and materials for hydraulic management/flow pattern, rate of flow on, over, and through the media, organic volume and growth, and process systems incorporating the same, used in conjunction with RBCs.

The present disclosure provides example embodiments of a media and shaft/load transfer mechanism systems incorporating the same for a rotating biological contactor. Media disks of various diameters, which may be determined by the volume of wastewater to be treated, may include a substrate disk having a flat or corrugated surface of concentric circles of perpendicular projected fins from the outer to inner diameter of the disk. The substrate can have flow-through passages to optimize flow pattern and rate, or a solid surface. When passage design is used variations of size and shape are positioned from outside diameter to inner diameter of the media segments. The swept arc shape of the flow through passage follows the helix pattern of the fins from the outer diameter to the center shaft hole. The media has fins of various geometries, pitch, height, and size on both sides of the substrate extending perpendicularly from the substrate. The fin design(s) and positioning create controlled and extended flow of wastewater over the surface of the media and the attached biomass and capture and control flow to the center of the disks. As the fins enter and pass through the wastewater creating aeration, oxygenation, mixing, and turbulence of the wastewater. Two or more disks abut axially on a shaft/load transfer mechanism tubes. A specific dimensional standoff is achieved between the disks by the load transfer support tube grommet added to the support drive shaft or incorporated in the substrate. Disk segments abut to one another along the straight flat and curved surfaces of the substrate; protruding tabs located on the out perimeter and sides of the media segments creating slide planes that maintain the position of the media segments to one another without locking in place. The geometry of the media provides free passage of wastewater and air, and the flat or corrugated substrate, passages, and fins provide controlled movement of the water during each rotation, and while the disk slices through the air and water perpendicular to a direction of rotation, the flat or corrugated substrate, holes, and fins may control flow over and through an attached biomass during each rotation.

Supersaturation of Oxygen caused by rapid aeration is often seen beside hydropower dams and large waterfalls. Unlike small rapids and waves, the water flowing over a dam or waterfall traps and carries air with it, which is then plunged into the water at greater depths and thus greater hydrostatic pressures. This entrained air may be forced into the solution, potentially raising saturation levels over 100%. The gas-liquid mass transfer in a bioprocess is strongly influenced by the hydrodynamic conditions in bioreactors. These conditions are known to be a function of energy dissipation that depends on the operational conditions, the physicochemical properties of the culture, the geometrical parameters of the bioreactor and on the presence of oxygen consuming cells. Turbulence in water flow has been found to be an important mechanism for Oxygen transfer into a liquid.

An RBC is a fixed film technology, which may include a rotating drive shaft to which one or more banks of media are attached, and which are, in-turn, rotated by the drive shaft. A plurality of parallel support shafts may be employed to aid in the support of the media partially based on the media design and material used. The media may be arranged with approximately 35%-45% of the media, any given time, immersed in the wastewater. As the media rotates slowly into and out of the wastewater, microorganisms in the wastewater attach themselves to the media, forming a biomass. The media is the attachment point for a microbial biomass that during its lifecycle consumes the organic waste and oxygen in the water, thereby cleaning the water as the secondary treatment process. As the media rotates into the air above the wastewater, the microorganisms biodegrade contaminants, e.g., into carbon dioxide and water.

RBCS operate using both a biological phase of oxygen transfer and a physical phase of oxygen transfer. The biological phase refers to a condition where the media is above the surface of the water, and the microbes are exposed to air. The physical phase refers to a condition where the media is below the surface of the water.

Models regarding performance of RBC devices assume that dissolved oxygen (DO) in the biozone tank the biological phase of oxygen transfer does not provide significance treatment efficiency, and an adequate amount of oxygen could be supplied during the physical phase of oxygen transfer. Thereby most of the mathematical models of performance have been developed considering the biological step to be the rate limiting step. Such mathematical models may assume that the only limiting factor for microbial growth is substrate concentration itself. These models may not be suitable when the RBC is operated at a high organic loading rate or when dissolved oxygen is lower than 1-2 mg/L. It is therefore important to quantify the oxygen transfer in RBC.

The design strategy for increased liquid oxygenation, oxygen transfer, and turbulence in the Physical and Biological phases is primary element in the concept, design, and engineering of the RBC media.

The microorganisms in typical municipal wastewater may form a biomass on the media that is about 3-5 millimeters thick. Some RBC media may include planar surfaces that are either flat, folded, with conical pin projections, or other surface projections, and are made of mesh or various materials. When the system becomes overloaded, the biomass may grow to a thickness of 5 mm or more. When this occurs, the microorganisms attached directly the media may die because of aging and/or limited access to food and/or oxygen.

A partial cause for this overload condition is shortcomings in the construction of traditional media, which only provides to randomly wash the wastewater over the biomass in a laminar flow limiting the supply of low oxygen wastewater and food supply. Therefore, to increase the efficiency and advantages of RBC technology there exists a need for a media design that improves efficiency by the use of hydraulic management/flow pattern, rate of liquid flow on and over the media during rotation creating turbulence and mixing, rotational speed, and creating higher oxygen levels in the wastewater in the physical phase of the system and process, for use in conjunction with rotating biological contactors and the like.

The RBC systems of the present disclosure may provide substantially higher performance than conventional RBC designs. The RBC systems of the present disclosure provide approximately 40% more surface area available for microbe growth than many conventional RBC media. Based on design characteristics and initial performance of the media, the RBC system of the present disclosure is expected to provide oxygenation efficiency 3-4 times greater than conventional RBC systems of similar size. Furthermore, the media disks of the present disclosure do not retain biological material after its lifecycle is complete (i.e. dead microbes), as can happen with some conventional designs, and which can cause a dramatic reduction in performance over time.

System Process Flow

FIG. 1 shows a top view of a wastewater treatment system 10 including an RBC apparatus 20, in accordance with the present disclosure. Plant volumes may range from onsite single-family homes through high process volume municipal size, and transportable wastewater treatment systems and processes. The system flow and rate are based on specific design criteria for plant processing—gallons per day processing, biological loading, gravity flow levels, and wastewater/system retention time engineered into the system for maximum treatment efficiency. RBC system performance is determined by making use of natural physical and biological characteristics of nature and the design of media disks to efficiently and effectively clean organic wastewater.

Wastewater the wastewater treatment system 10 from an equalization/sump tank (not shown) into the RBC primary settling tank/system 22, through an inlet 21 from a collection system from one or more sources, such as a single family home, a small development or community, a municipality, industrial farm, or other collection source, based on system capacity demands and other factors. The flow and level of the wastewater into the primary tank 22 may be controlled by a series of floats (not shown) and a pump (not shown) from a separate tank (sump tank/equalization tank) or gravity fed from a separate equalization tank or collection system (not shown). The bottom of the primary tank 22 slopes from the outer edges of the tank to a first waterwheel 30 to flow sludge along with wastewater for pick up by the first waterwheel 30 for processing.

Wastewater is metered and transferred from the primary tank 22, by the first waterwheel 30, and into a first transfer pipe 32. Treatment system volume/capacity may be based on a number of cups 36, size, and the rotational speed of the drive shaft 40 and the motor 44 turning the first waterwheel 30. Wastewater enters a secondary tank 24 from the first transfer pipe 32. Wastewater is discharged at the far end of the secondary tank 24 to create a flow pattern within the tank for continuous water movement.

The biozone tank 26 includes a first subsection 50a, a second subsection 50b, and a third subsection 50c, with the subsections 50a, 50b, 50c being separated by partitions 52a, 52b. Each of the partitions 52a, 52b have corresponding level flow holes 53a, 53b for water to flow between the subsections 50a, 50b, 50c at a controlled rate. The RBC apparatus 20 includes several media groups 56a, 56b, 56c including a first group 56a located in the first subsection 50a, second media group 56b located in the second subsection 50*b*, and a third group 56*c* located in the third subsection 50*c*. However, this is merely an example, and the RBC apparatus 20 may have any number of the subsections 50*a*, 50*b*, 50*c*, with any number of media groups 56*a*, 56*b*, 56*c*.

Wastewater enters the biozone tank 26 through an entry hole 54 in the bottom of the first subsection 50*a* at design flow volume based on the designed liquid level in the secondary tank 24, which also establishes a percentage of media submersion in the biozone tank 26. The level flow holes 53*a*, 53*b*, which may be adjustable, control flow of water between the subsections 50*a*, 50*b*, 50*c* of the biozone tank 26. The RBC apparatus 20 uses gravity and a serpentine flow pattern within the biozone tank 26 to determine the flow and retention time of the liquid in each of the subsections 50*a*, 50*b*, 50*c* to provide a determined processing duration of the wastewater in each stage of secondary treatment by the media groups 56*a*, 56*b*, 56*c*. Factors for proper operation of the RBC apparatus 20 include the design of the media, the total surface area of the media, the volume of the attached healthy biomass grown, the media design intent to allow dead biomass to sough from the system, the oxygenation of the wastewater, the oxygen transfer process, and the turbulence and mixing of the water in each of the subsections 50*a*, 50*b*, 50*c*, and phase of the media rotation.

Wastewater is treated by the removal of organic material consumed by a biomass attached to the media groups 56*a*, 56*b*, 56*c*, and by the liquid flow pattern, in both the oxygen transfer in the physical and biological phases, turbulence, mixing, and duration, managed by the media design and design of the biozone tank 26, through the subsections 50*a*, 50*b*, 50*c*.

Wastewater processed in and by the first media group 56*a* in the first subsection 50*a* uses gravity and serpentine flows to the second subsection 50*b* at design flow elevation through a first level flow hole 53*a* in the first partition 52*a*. Wastewater processed in and by the second media group 56*b* of media in the second subsection 50*b* uses gravity and serpentine flows to the third subsection 50*c* at a design flow elevation through a second level flow hole 53*b* in the second partition 52*b*. Wastewater processed in and by the third group 56*c* of media in the third subsection 50*c* uses gravity and serpentine flows out of the biozone tank 26 at design flow elevation.

A metered portion of wastewater processed in and by a biomass on the third group 56*c* of media in the third subsection 50*c* is recirculated by a second waterwheel 60, which is attached to the drive shaft 40. This recirculated flow is poured into a recirculation trough 62 and conveyed by a recirculation pipe 64 back into the secondary tank 24 to dilute the raw wastewater in the secondary tank 24. This action reduces the stress on the overall demands of performance on the system and process flow.

Processed wastewater from the third group 56*c* of media in the third subsection 50*c* flows by gravity via a discharge pipe 66 through an access hole 68 and into a settling tank 28. A weir 70 is located at an entry into the settling tank 28 to slow the flow prior to discharge to the receiving waters or discharge system.

A lift pump, floats (not shown), and pipe system 72, at the bottom of the settling tank 18 may, on a timed basis, lift accumulated sludge in the bottom of the tank back into the primary tank 22 for further treatment. The bottom of the tank is slope contoured so that accumulated sludge flows to the lift pump suction point. An effluent discharge port 74 discharges processed liquid from the wastewater treatment system 10, using gravity flow. An optional design provides for the wastewater to pass through a UV light system (not shown) eliminating pathogens in the treated water.

Additional processes (not Shown) can include removal of Fats Oils and Grease (FOG) prior to secondary RBC treatment and or nitrogen, phosphorus treatment processes, and pathogens by Ultraviolet (UV) light after the RBC treatment.

RBC General Information

The effective level of performance for the treatment of wastewater using Rotating Biological Contactor (RBC) technology may depend on several pretreatment conditions in wastewater treatment and specifically characteristics of the RBC/media as the secondary treatment. The microbes consume the organic matter and oxygen in the wastewater, thereby cleaning the water in this secondary process step. The media/design features provide the surface area for the biomass/microbes to attached to. Its design and function are the primary feature for the volume and growth of the biomass on the media, its health, the amount of oxygen transfer to the biomass.

Figure 2A:
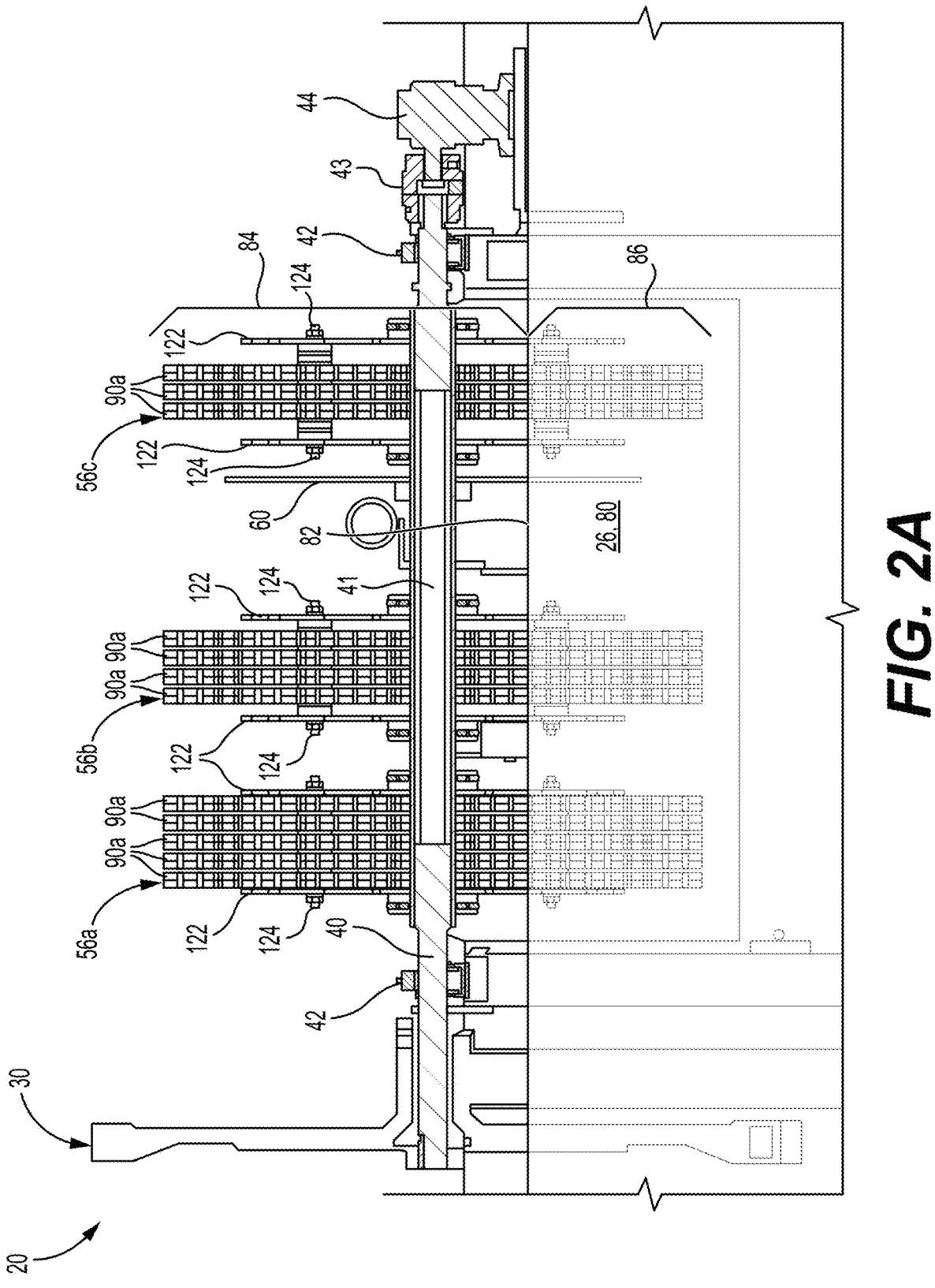
FIG. 2A shows a cross-sectional side view of a rotating biological contactor apparatus, in accordance with the present disclosure.
Figure 2B:
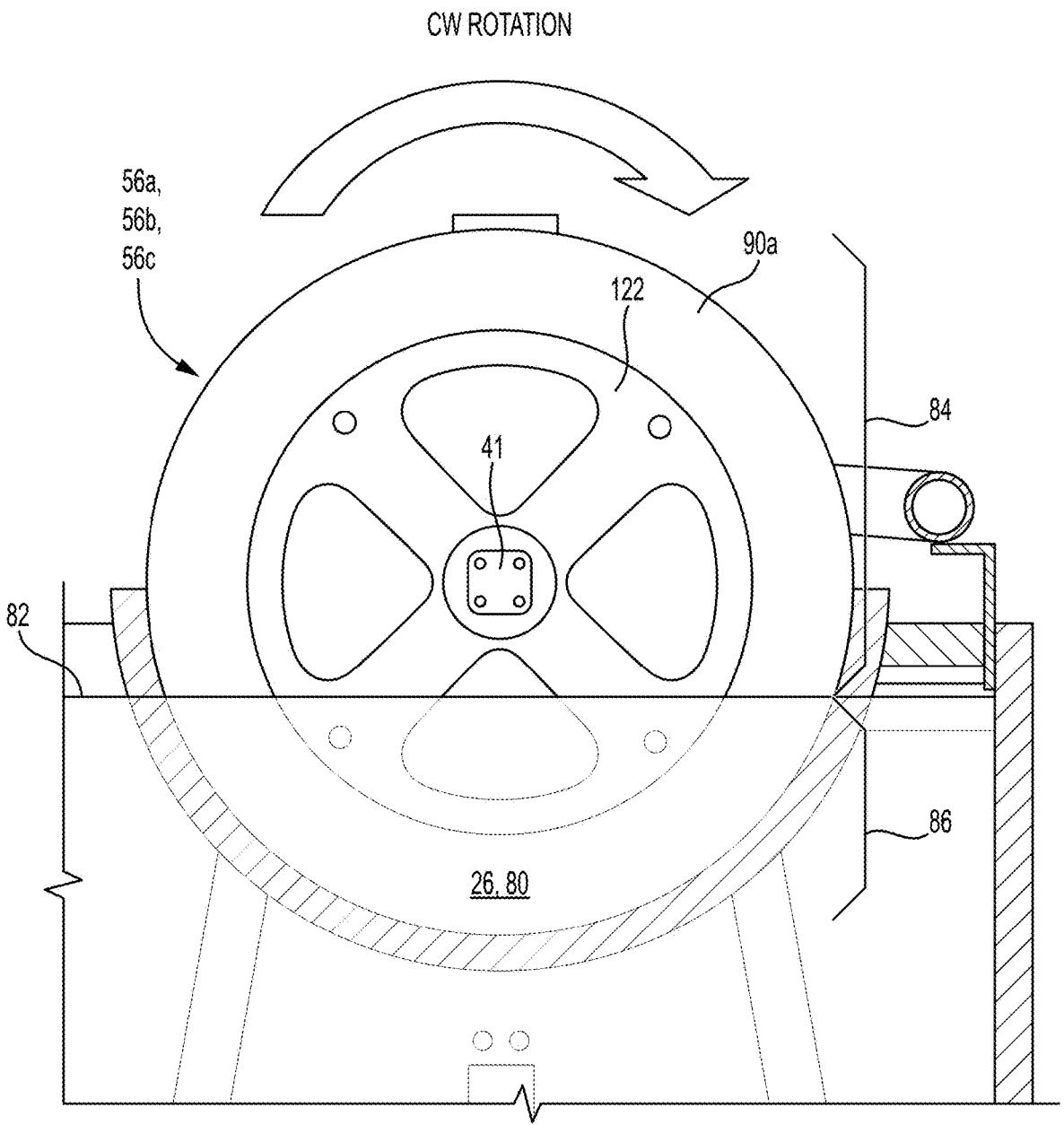
FIG. 2B shows a side view with partial transparency of the rotating biological contactor apparatus of FIG. 2A, and in accordance with the present disclosure.

FIGS. 2A-2B show additional views of the RBC apparatus 20 of the present disclosure. FIGS. 2A, 2B show the RBC apparatus 20 including a biological phase 84 and a physical phase 86 phase of the media rotation, the depth of growth of the biomass on the media, its life cycle phase, and how the sluffing of dead biomass passes out of the media and thus—overall performance of the RBC treatment technology.

FIG. 2A shows the media groups 56*a*, 56*b*, 56*c* of the RBC media attached to a drive shaft 40. The drive shaft 40 is supported on bearings 42 on each end of the biozone tank 26. A motor 44, such as an electric motor with a reduction gearbox, is attached to the drive shaft 40 for driving the drive shaft 40 to rotate. A coupling 43, such as a two-piece jaw coupling, couples the motor 44 to the drive shaft 40 for transmitting torque therebetween, while allowing the motor 44 to be removed and/or replaced for servicing. The coupling 43 may provide some isolation or dampening for preventing vibration from being transmitted between the drive shaft 40 and the motor 44.

As shown in FIG. 2A, the first media group 56*a* includes five of the first media disks 90*a*, the second media group 56*b* includes four of the first media disks 90*a*, and the third media group 56*c* includes three of the first media disks 90*a*. However, this is merely an example, and any of the media groups 56*a*, 56*b*, 56*c* may have a different number of the first media disks 90*a* and/or the second media disks 90*b*. As also shown in FIG. 2A, each of the media groups 56*a*, 56*b*, 56*c* includes the first media disks 90*a* held between two end plates 122 and attached thereto by load transfer fasteners 124. Furthermore, each of the media groups 56*a*, 56*b*, 56*c* is disposed on, and attached to, a square tube 41 of the drive shaft 40.

Figure 3:
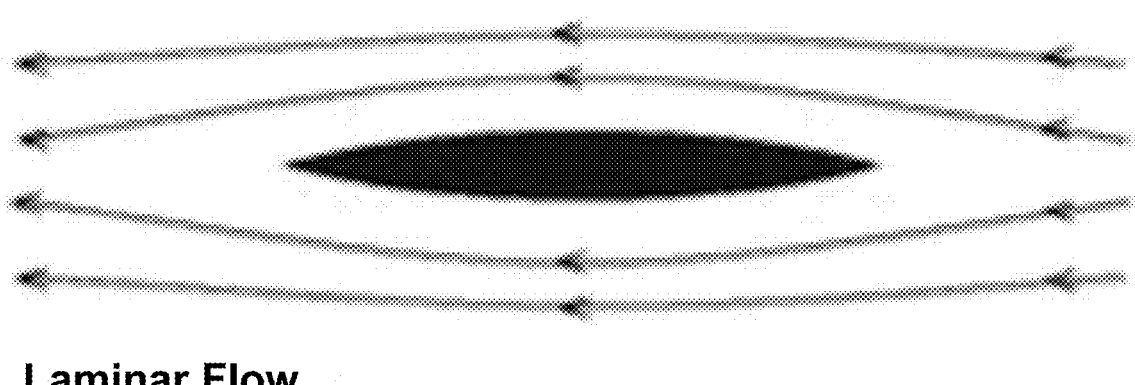
FIG. 3 shows a diagram illustrating a laminar flow.
Figure 4:
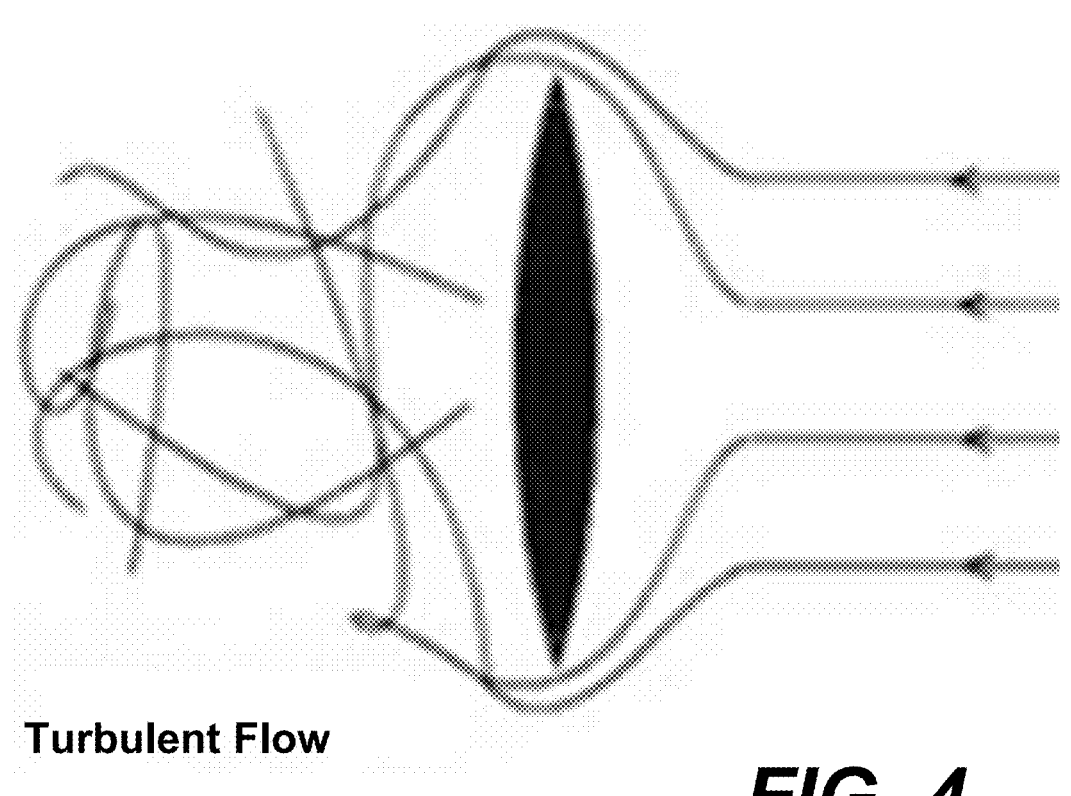
FIG. 4 shows a diagram illustrating a turbulent flow.

FIG. 3 shows a diagram illustrating a laminar flow, in which a fluid flows around a structure in two or more sides and rejoins in a common flow direction. FIG. 4 shows a diagram illustrating a turbulent flow, in which the fluid flow is disrupted by a structure and does not rejoin in a common flow direction after being divided and flowing around two or more sides of the structure.

With conventional (laminar flow) media designs, microbes have limited contact time with the wastewater to absorb organic matter and oxygenated liquid as its flow unimpeded back to the water surface by gravity. Oxygen transfer in the physical phase 86 of the process can be aided by oxygen bubble dispersion at the bottom of the secondary tank 24. Paddles, cups and other devises (not shown) can be attached to the drive shaft in various methods to provide oxygen to the wastewater in the physical phase 86.

Media Design Strategy and Intent

The media disks of the present disclosure may include structural elements, such as fins with specific characteristics, that create and sustain a large, healthy, high organic loading biomass on the media disks by creating a large attachment surface area, increasing the oxygen content of the liquid by creating oxygenation and oxygen transfer, turbulence of the liquid, managing the hydraulic flow and control, increasing exposure time of the biomass to the liquid through the 360 degrees of rotation in the biological phase 84 and physical phase 86 of the RBC treatment process.

To achieve the objectives, the media disks of the present disclosure, including substrate and fins, create a large usable surface area to maximize the amount of biomass growth, considering the general characteristics of the microbe life-cycle and RBC process; additional consideration for each final media design and configuration considers the following and other application specific considerations—the amount of organic matter and its composition in the influent waste-water; the amount of dissolved oxygen in the incoming wastewater; the amount of dissolved oxygen created during treatment process; the retention time required to process the liquid to discharge standards; the transfer of oxygen in the surrounding air to the biomass during the biological phase 84 of rotation of the media; the infusion of oxygen and the transfer of oxygen in the wastewater to the biomass during the physical phase 86 of rotation of the disk; the media design and disk spacing provides for the effective sluffing of dead biomass and displaces biomass so that the media does not plug up, disrupting liquid flow, or reduce the effective surface area by media flex or shape distortion, minimizing the long-term plugging of the media and loss of perfor-mance; the rotation speed of the drive shaft and media disks; and the effects on RBC overall process performance.

To achieve these performance objectives, the media design(s) uses the natural process in nature, and the concept of turbulence to clean organic matter from water, RBC process technology and characteristics, and the media disks 90a, 90b of the present disclosure, including fins 94a, 94b with a specific fin size, fin shape, fin configuration, fin orientation, and fin placement, to establish, direct, and control the hydraulic flow during rotation.

Rotational speed of the disk(s) is also a component to manage and control hydraulic flow over the media and through the biomass during rotation, creating a high level of oxygen in the liquid, optimizing the oxygen transfer to the biomass in the biozone tank using the media design and fin features described to capture and entrain oxygen as the fins enter the liquid in the biozone tank 26, and into the second-ary tank 24 via the recirculation waterwheel 60. The design is flexible in all basic design aspects to allow for perfor-mance variation based on organic loading of the influent, and effluent treatment requirements by application such as municipal or industrial farm application.

Disk Substrate

Figure 5:
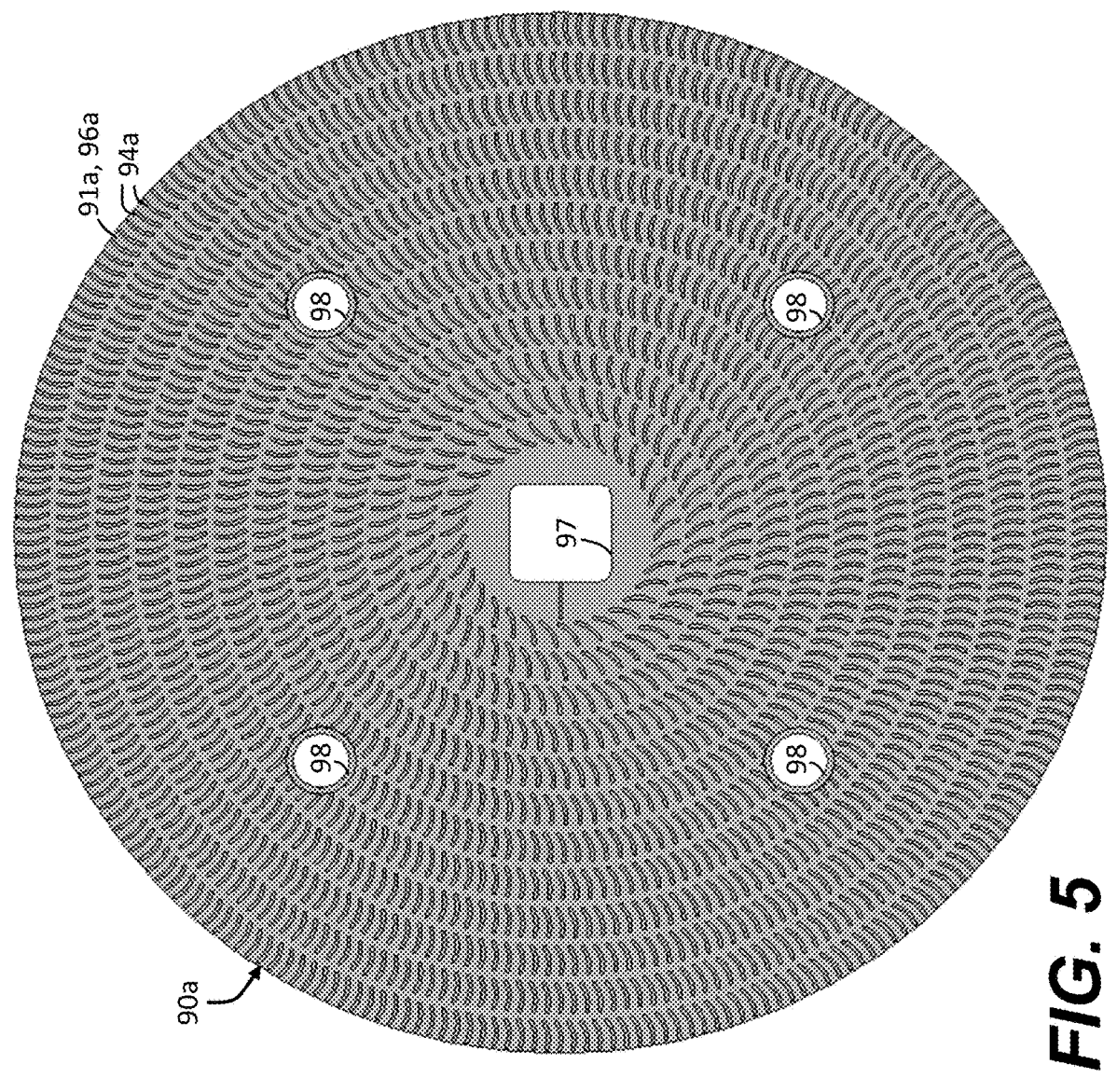
FIG. 5 shows a first media disk for a rotating biological contactor apparatus, and in accordance with the present disclosure.
Figure 6:
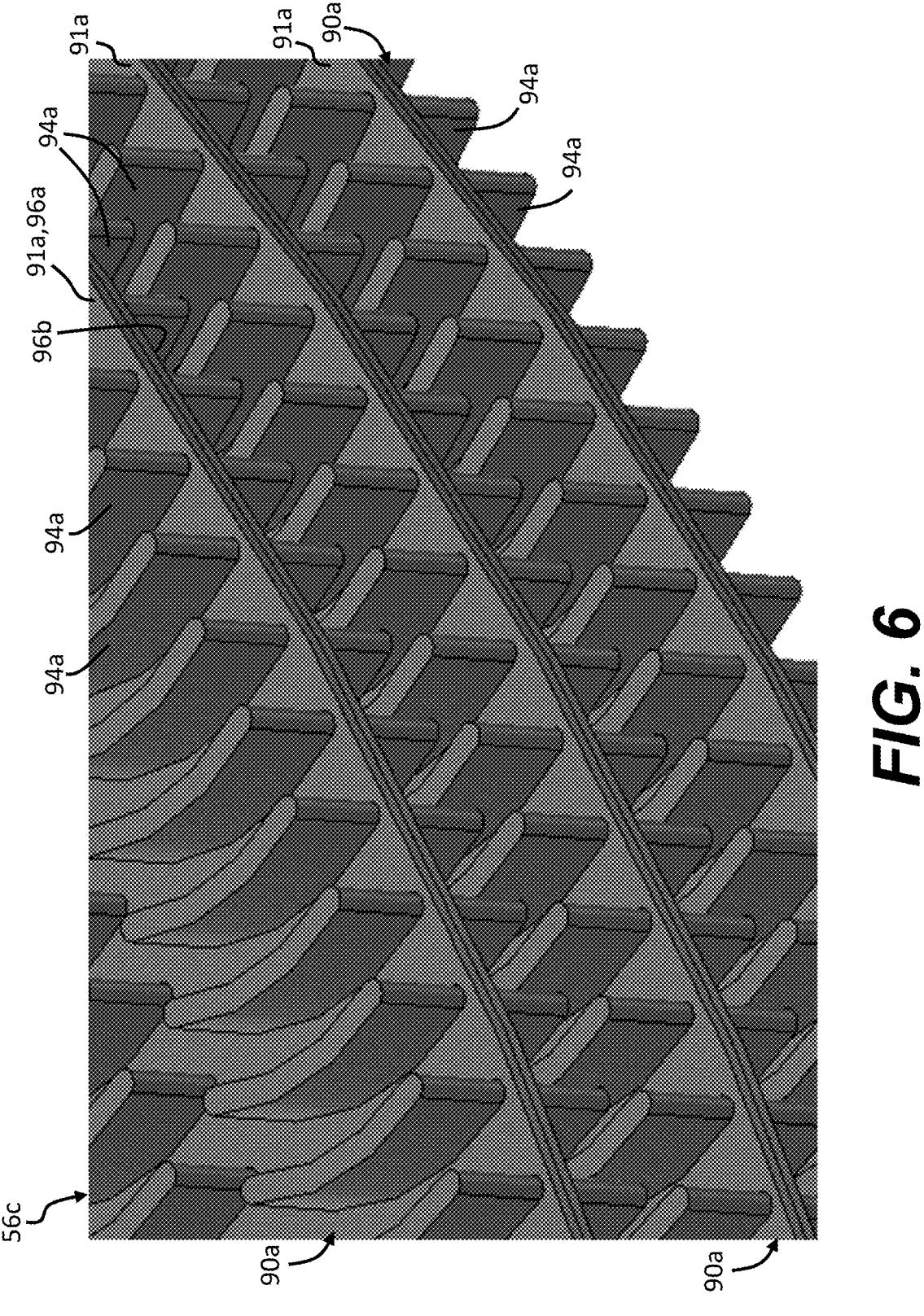
FIG. 6 shows an enlarged perspective sectional view of a media group including three of the first media disks.

FIG. 5 shows a first media disk 90a, and FIG. 6 shows an enlarged perspective sectional view of a media group 56a, 56b, 56c, including three of the first media disks 90a. As shown, the first media disks 90a include a flat substrate 91a having a disk shape with a first surface 96a and a second surface 96b opposite the first surface 96b, with each of the surfaces 96a, 96b being flat. A plurality of first fins 94a protrude from each of the two surfaces 96a, 96b and are arranged in concentric rings. The first media disk 90a shown in FIG. 5 includes twelve concentric rings of the first fins

94a. However, the first media disk 90a may have a different number of concentric rings. The concentric rings of the first fins 94a may be spaced apart from one-another by a spacing distance of 0.25 inch. However, other spacing distance may be used.

Each of the first fins 94a extends for a length in a radial direction and is configured to generate a turbulent flow as they pass through a surface 82 of the liquid 80, as the first media disk 90a rotates. In some embodiments, each of the first fins 94a are integrally molded with the flat substrate 91a. As shown on FIGS. 9A-9C, each of the first fins 94a defines an arcuate cross-section, with ends thereof config-ured to enter the liquid surface before a central portion thereof, as the first media disk 90a rotates.

Referring back to FIG. 6, each of the first fins 94a defines a substantially constant cross-section along a height direc-tion generally perpendicular to a corresponding surface 96a, 96b of the flat substrate 91a.

Each of the first media disks 90a includes a central hole 96 around a center thereof and with a square shape config-ured to fit onto a corresponding square tube 41 of the drive shaft 40 for driving the first media disks 90a to rotate with the drive shaft 40. However, this is merely and the media disks 90a, 90b may use other mounting arrangements, such as a hub that engages the drive shaft 40, and which is bolted or otherwise secured to the media disks 90a, 90b.

Grommets (98)

Each of the first media disks 90a also includes a plurality of grommets 98, each having a tubular shape extending perpendicularly from a corresponding surface 96a, 96b and beyond a height of the first fins 94a in a direction perpen-dicular to the corresponding surface 96a, 96b, and to provide an even spacing between adjacent ones of the first media disks 90a in each of the media groups 56a, 56b, 56c. The grommets 98 may protrude, for example, by 15.875 mm beyond the height of the first fins 94a. However, the grom-mets may have a different height to provide a different spacing between adjacent ones of the first media disks 90a. The grommets 98 may provide a mounting location of first media disks 90a to the load transfer rods 99.

Figures 7A, 7B:
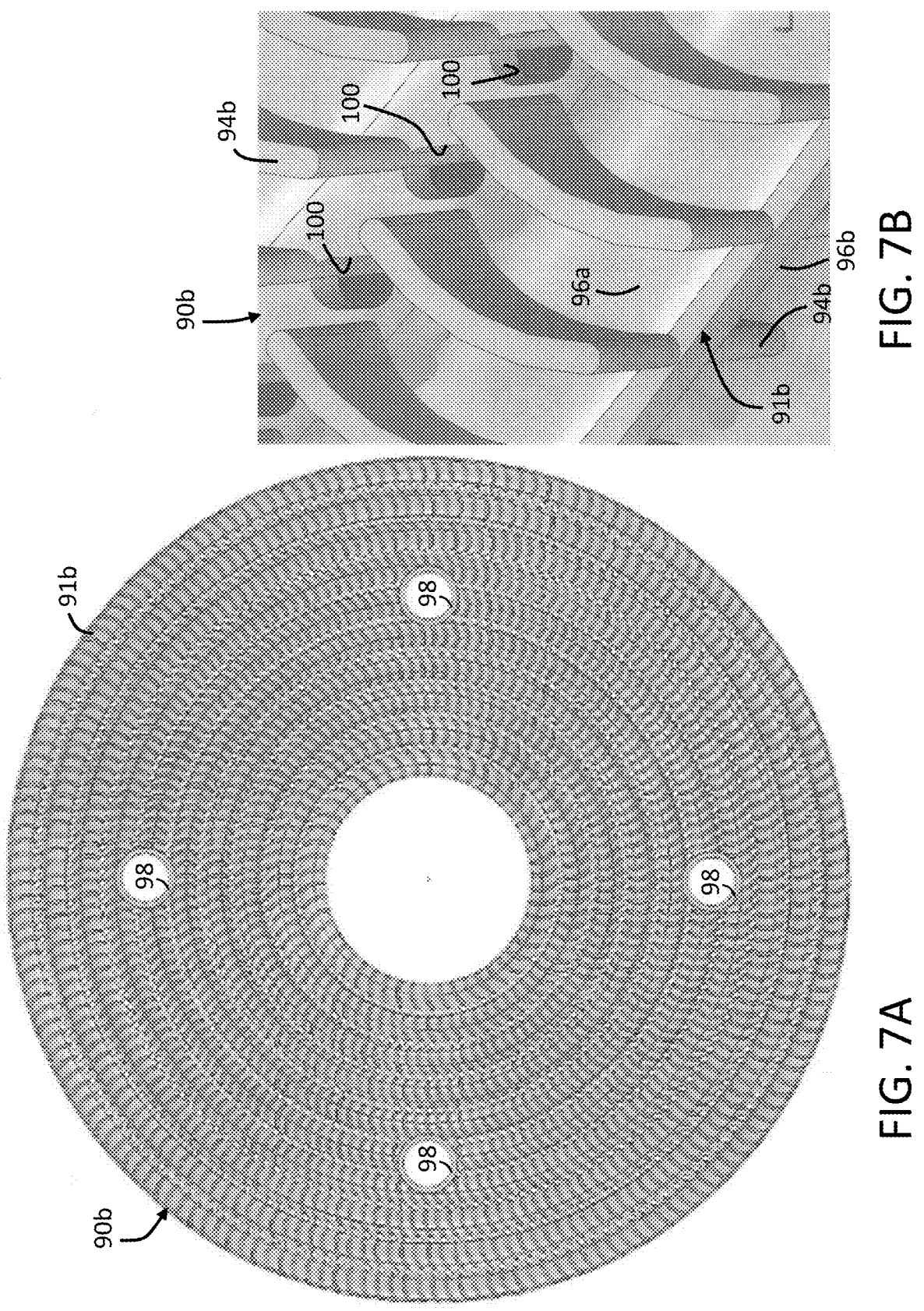
FIG. 7A shows a second media disk for a rotating biological contactor apparatus, and in accordance with the present disclosure.
FIG. 7B shows an enlarged perspective sectional view of the second media disk of FIG. 7A.
Figure 7C:
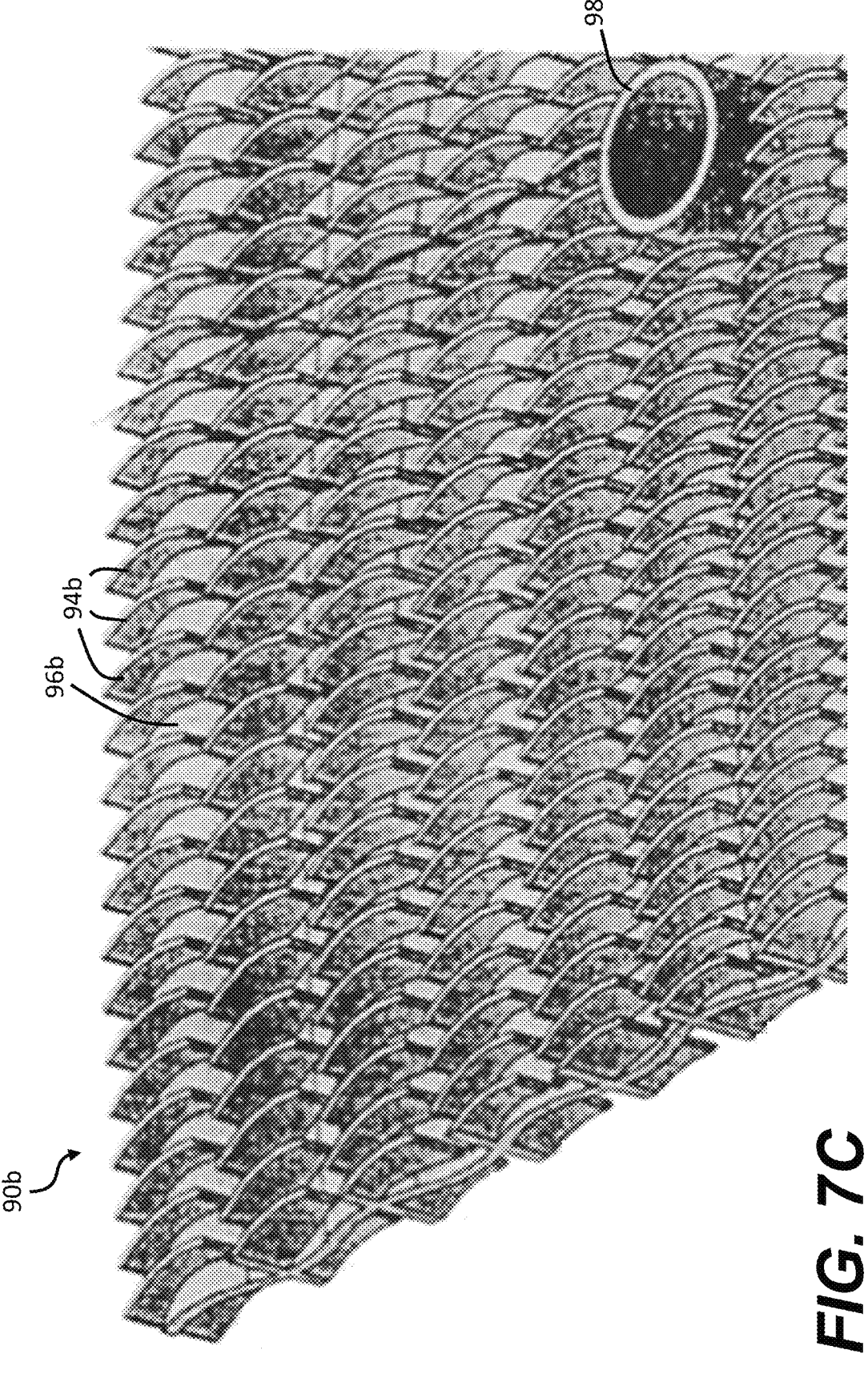
FIG. 7C shows an enlarged perspective sectional view of the second media disk of FIG. 7A.
Figures 8A, 8B:
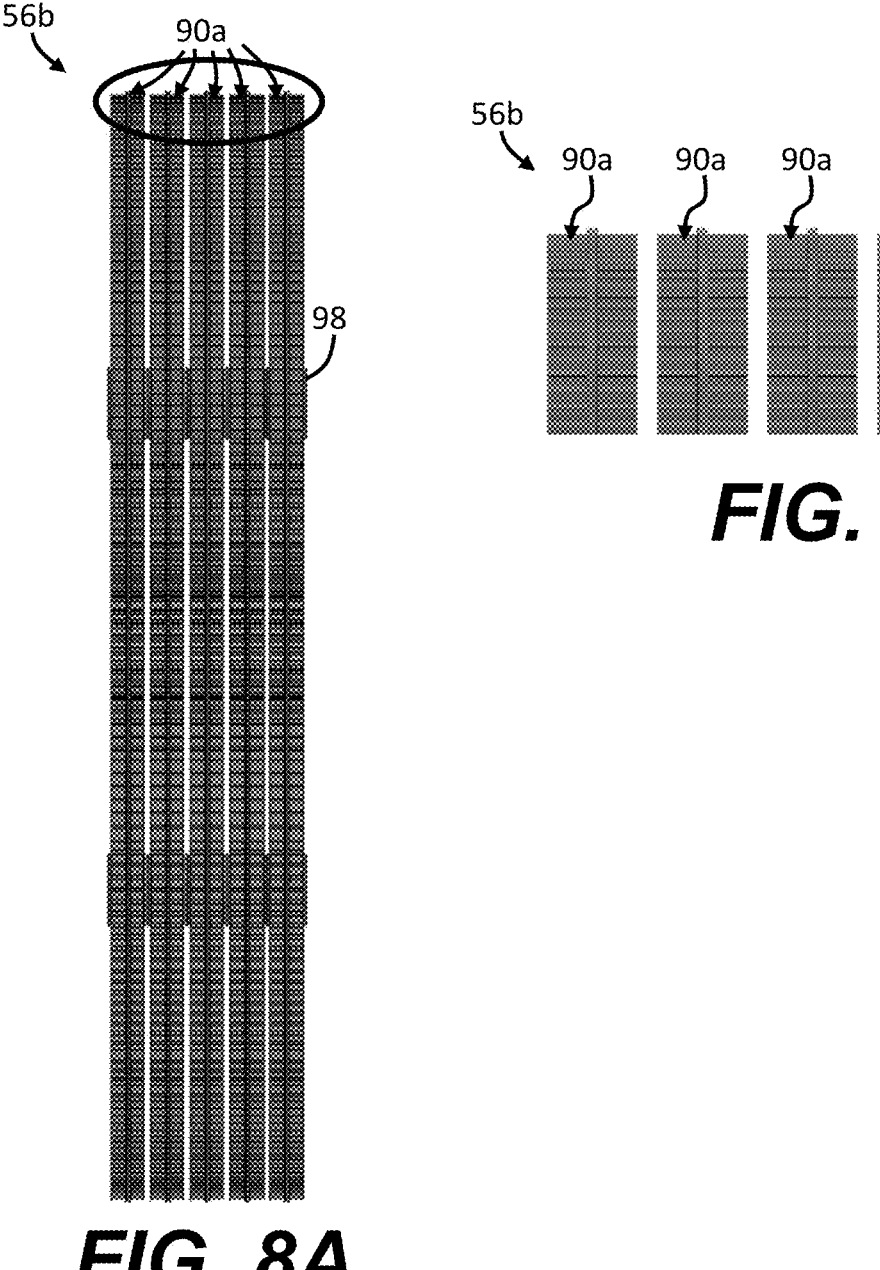
FIG. 8A shows a side view of a media group including four of the first media disks.
FIG. 8B shows an enlarged sectional view of FIG. 8A, showing a peripheral edge of each of the four first media disks.

As shown in FIGS. 7A and 7C, the second media disks 90b include grommets 98, each having a tubular shape. As shown in FIGS. 8A-8B, the grommets 98 may provide a spacing of about 0.25 inch between adjacent ones of the first media disks 90a in the media groups 56a, 56b, 56c. The tubular shape of the grommets 98 are configured to receive a load transfer rod 99 therethrough for interconnecting the first media disks 90a in each of the media groups 56a, 56b, 56c.

The grommets 98 may be molded and/or added (e.g. stacked as separate pieces) on one or more sides of the media disk 90a, 90b to act as spacers between the media disk 90a, 90b. Thickness of the grommets 98 may be determined based on an amount of organic material entering the system for treatment.

FIGS. 7A-7C shows a second media disk 90b for the RBC apparatus 20. The second media disk 90b may be similar or identical to the first media disk 90a, except for a few differences described herein. The second media disks 90b include a corrugated substrate 91b instead of the flat sub-strate 91a of the first media disk 90a. The corrugated substrate 91b may have a corrugation amplitude of about 2 inches from peak-to-peak. However, this corrugation ampli-tude may vary by 0.5 inches height from the peak on one side to the peak of a next course on the opposite side of the second media disk 90b. In some embodiments, the corrugations may be formed in concentric rings, with decreasing amplitudes from an outer diameter to inner-most diameter.

The second media disks 90*b* also include second fins 94*b* that may be similar or identical to the first fins 94*a*, except that they protrude generally perpendicularly from a surface of the corrugated substrate 91*b*, and thus have a contoured lower end that follows a corresponding contour of the corrugated substrate 91*b*. As shown in FIG. 7B, the second fins 94*b* may protrude from each of two opposite surfaces of the second media disk 90*b*. However, the second fins 94*b* could be formed on only one of the surfaces of the second media disk 90*b*.

Flow-Through Passage Holes (100)

As shown in FIG. 7B, the second media disks 90*b* include passage holes 100 through the corrugated substrate 91*b*. The passage holes 100 may function to manage flow, create turbulence, improve mixing and aeration of the wastewater in the physical phase 86, and prevents the system from possibly pumping the liquid through the system process.

During rotation, as the passage holes 100 enter the liquid 80, the passage shape is such that water is directed from one side of the second media disks 90*b* to the other side, as the water encounters the passage holes 100. Passage design shape and draft are configured to flush liquid in opposite direction of normal gravitational flow to increase turbulence, mixing, and slow liquid flow through the biozone tank 26. A second flow strategy is to direct the flow to the center of the second media disks 90*b* to provide maximum flow to the slower rotating media center. The passage design use variations of size and shape positioned from outside diameter to inner diameter of media segments. The swept arc shape of the flow through passage holes 100 may follow a helix pattern of the second fins 94*b* from the outer diameter to the center hole.

All fin, course, and passage holes can vary based on organic loading of the influent, effluent and various performance and requirements of the system. Basic fin spacing between the fins 94*a*, 94*b* may be 0.28 inch. However, other fin spacing may be used.

The media disks 90*a*, 90*b* may be made of Polypropylene material. However, other types of material, such as Polyethylene thermoplastic and various percentages (approximately 15%-40%) of fiberglass or other stiffener materials for additional strength and rigidity. The substrate 91*a*, 91*b* of the media disks 90*a*, 90*b* may have a thickness of about 0.25 inch. However, the thickness may depend on material stiffness and/or other design and performance requirements.

Physical Phase of Treatment (86)

Figures 9A, 9B, 9C:
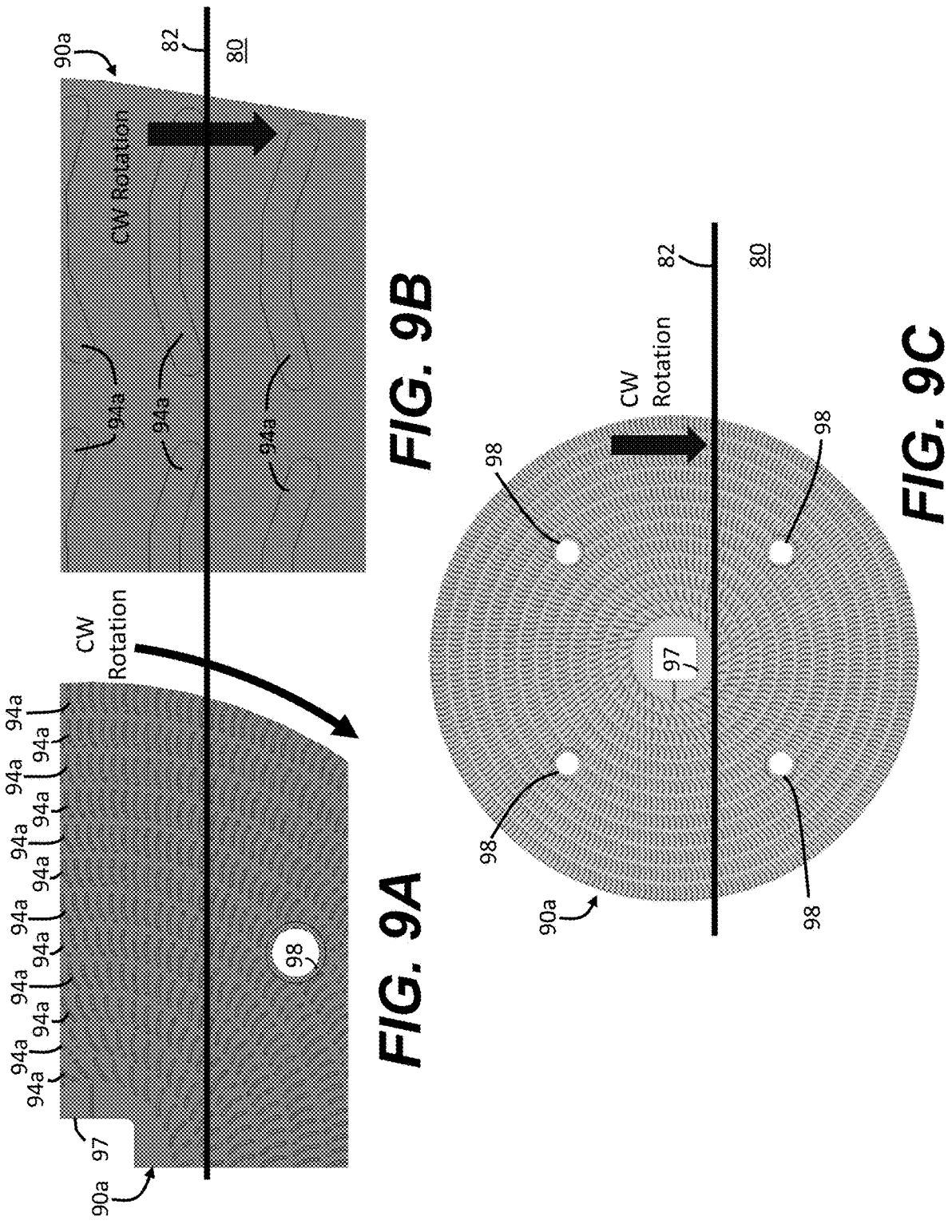
FIGS. 9A-9C each show views of the first media disk rotating in a clockwise direction through the surface of a liquid.

FIGS. 9A-9C each show views of the first media disk 90*a* rotating in a clockwise direction through the surface 82 of the liquid 80.

As shown in FIG. 9A, the first media disk 90*a* with first fins 94*a*, and with biomass attached thereto, enter the liquid 80 in plane. The first fins 94*a* capture and entrains oxygen and the oxygenated liquid remaining in the biomass and on the disk during rotation, forcing both into the liquid 80 in the subsections 50*a*, 50*b*, 50*c* of the biozone tank 26. As the media disks 90*a*, 90*b* (substrate, fins, channels/holes) rotates through the liquid 80, creating turbulence, mixing the captured oxygen and liquid, and supersaturates the liquid via oxygenation process. The turbulence of the supersaturated liquid provides additional oxygen transfer/process performance to the biomass during the physical phase 86 of the process beyond a laminar flow of liquid on typical RBC media.

Biological Phase of Treatment (84)

As shown in FIG. 9B, and as the first media disk 90*a* rotates to bring the curved fins 94*a* out of the liquid 80 and into the biological phase 84, the first fins 94*a* with their curved shape, and with attached biomass, lifts the liquid 80 as the rotation continues, a controlled hydraulic flow of liquid cascades over and through the biomass on the fins and substrate extending the contact time with the surrounding air, biomass, and further create oxygen transfer as the liquid breaks into small droplets, creating more surface area for oxygen transfer, maximizing overall oxygen transfer to the liquid. As the liquid cascades to the center of the medithe channels create rivulets carrying the liquid to the next descending course of fins, absorbing oxygen as the liquid falls by gravity to the inner most fin course of the media disk and to the biozone water level increasing oxygen absorption duration. As the liquid flows at a point in the rotation the biomass receives oxygen transfer from the surrounding atmosphere, making the 360-degree rotation more effective than traditional media and the laminar flow processes.

Fins

On the upward rotation, as best shown in FIG. 9C, the biological phase 84 of the treatment and rotation, the fins 94*a*, with biomass attached thereto, capture and lift wastewater. The second media disks 90*a*, including the second fins 94*b* with their curved shape, and with the passage holes 100 and the corrugated substrate 91*b*, as shown in FIG. 7A, a subsequent control/direct hydraulic flow of the liquid is created from each course to the next smaller course and to the center of the second media disk 90*b*, thereby lengthening the contact time of the oxygenated water and biomass. The first media disk 90*a*, with a flat substrate follows a similar process, but the channels and the first fins 94*a* directs the wastewater to a next smaller concentric ring of the fins 94*a*. As the angle of the fin 94*a* changes, releasing the liquid during rotation, water cascading from an outer course to a next inner course of the fins 94*a* fully utilizes the surface of the first media disk 90*a* to its center shaft hole. The fins 94*a* in each smaller concentric ring slows the gravity flow of the liquid, additionally promotes oxygenation and oxygen transfer by creating water droplets which further encourages oxygenation and oxygen transfer and absorption of the surrounding air and water and slows the flow of the water droplets to the surface in the subsections 50*a*, 50*b*, 50*c* of the biozone tank 26, preventing a laminar flow time and pattern as the water cascades over the fins 94*a*, and surfaces as gravity pulls the water down.

As shown in FIGS. 9A-9C, and as the fins 94*a* enter the liquid 80 during the physical phase 86 of rotation, the curvature of the fins 94*a*, and biomass attached thereto, capture and entrain air forcing the air into the water. The fins 94*a* create turbulence, and mixing, much like the bottom of a waterfall, and create additional oxygenation and oxygen transfer into the water as the air then works its way to the surface from depth. The high oxygenation/oxygen levels created by entrainment, water turbulence, mixing, and with the surface area design, a high organic loading is created and maintained. This rotation allows for an extended contact time for oxygenation and oxygen transfer in the water and flow through the biomass, much longer than a typical laminar flow, providing the biomass with a rich mixture of oxygen and organic matter (food). Cleaning the There are various media configurations, including fins, geometries, pitch, size, spacing from the surface of one fin to the surface of the adjacent fin, in a helical pattern of the substrate or flat, passage holes, channels, and other features based on a specific application and performance demand such as municipal wastewater or industrial farms to process various organic loading and discharge requirements.

The rigid media material and fin design facilitates oxygen transfer to the biomass and shear effect on the biomass to allow the controlled flow of water and cleaning of dead or dying biomass from the media all the way to the center shaft to reduce or eliminate plugging of the media or its trapping between the disks. The media design and rotational speed influences the performance parameters of the system.

In some embodiments, and as shown in FIGS. 9A-9B, The fins may be optimized for maximizing air to wastewater transfer for each of the subsections 50a, 50b, 50c of the biozone tank 26. During rotation of the monolithic structure of the load transfer mechanism and media, the system is designed so that as the fins/design meet the liquid surface level, as shown in FIG. 9C. The fins 94a,94b, and biomass attached thereto, are positioned to capture, entrain, and force air deep into the liquid, the turbulence and mixing created by the fins increases oxygenation of the liquid providing oxygen transfer to the liquid 80 in the subsections 50a, 50b, 50c of the biozone tank 26 during the physical phase 86, improving overall system performance during each rotation.

Media Disk Sections Design Configuration

Figure 10:
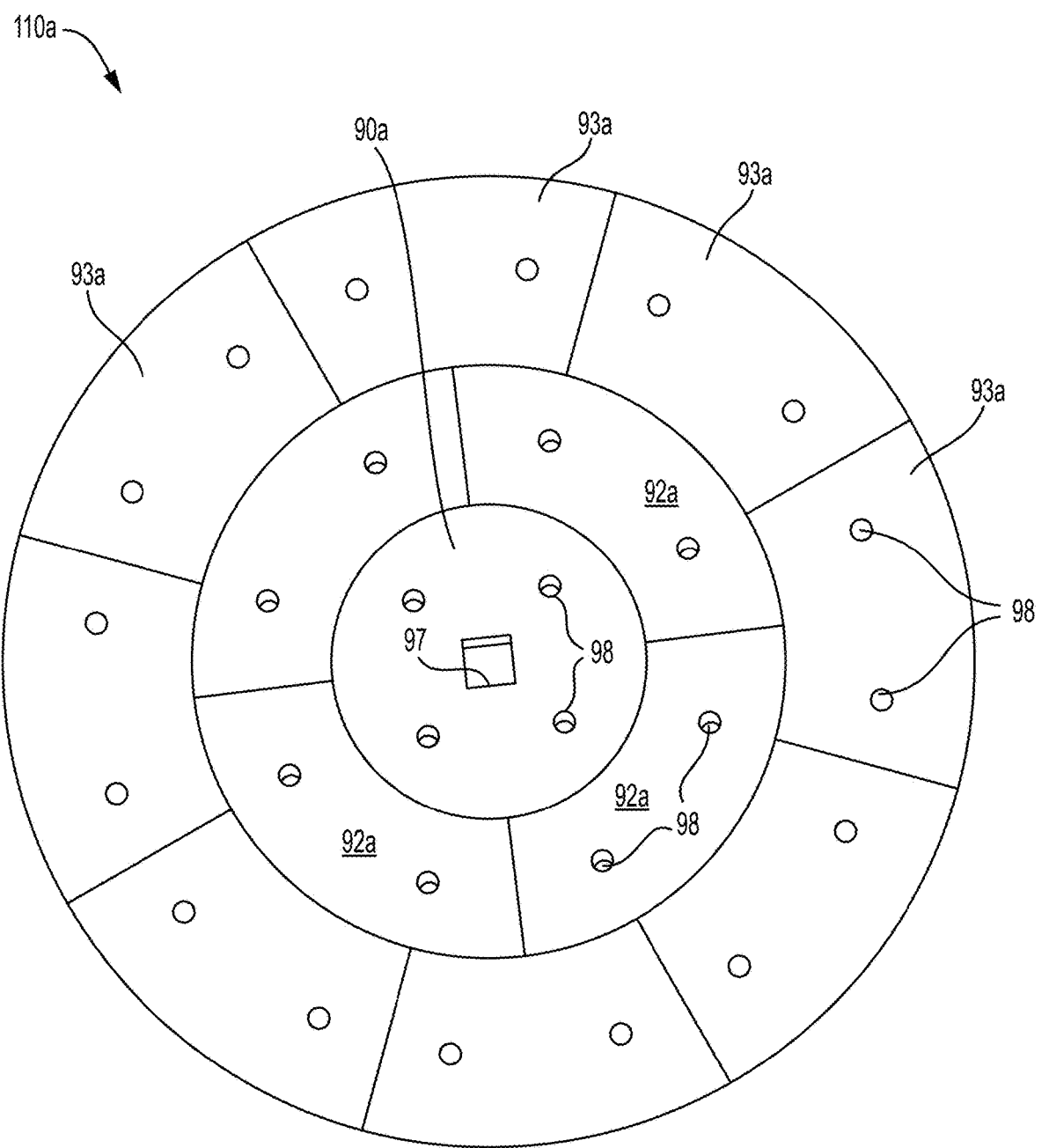
FIG. 10 shows a first disk assembly including the first disk with media segments arranged in two concentric annular rings thereabout.
Figure 11:
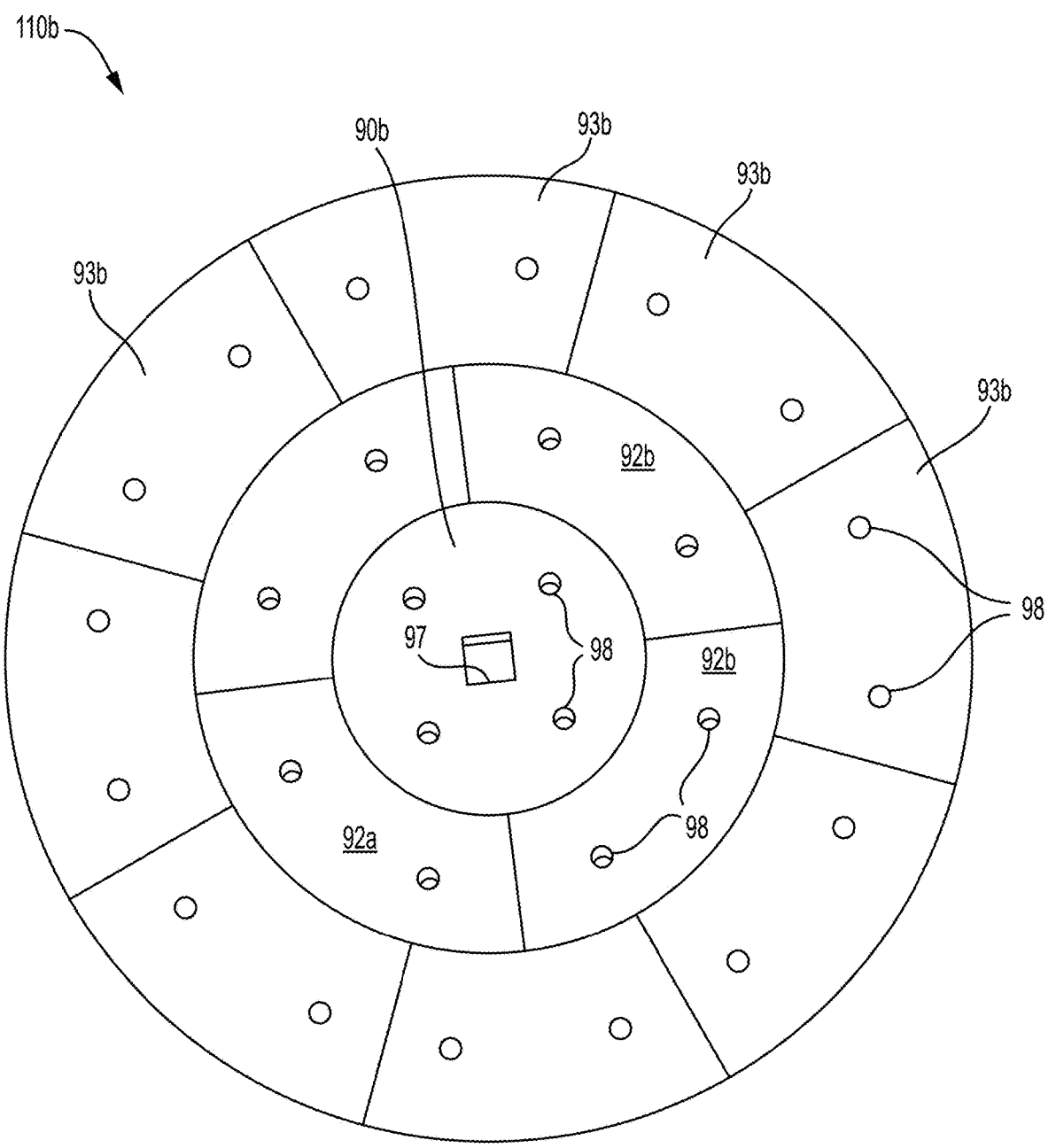
FIG. 11 shows a second disk assembly including the second disk with media segments arranged in two concentric annular rings thereabout.

FIG. 10 shows a first media disk assembly 110a including the first media disk 90a with a plurality of media segments 92a, 93a arranged in two concentric annular rings thereabout. FIG. 11 shows a second media disk assembly 110b including the second media disk 90b with media segments 92b, 93b arranged in two concentric annular rings thereabout. Each of the first media disk assembly 110a and the second media disk assembly 110b provides a disk for the RBC apparatus 20, with a modular design that can be configured in several different arrangements including:

a. A smallest arrangement, which may have a diameter of about 1.0 meter, including only the corresponding one of the first media disk 90a or the second media disk 90b.

b. A first larger arrangement, which may have a diameter of about 4 feet to 6 feet, and including the corresponding one of the first media disk 90a or the second media disk 90b with a set of first media segments 92a, 92b disposed in an annular ring about a peripheral edge thereabout, and attached thereto to rotate together, as a unitary assembly.

c. A second larger arrangement, which may have a diameter of about 10 feet, and including the corresponding one of the first media disk 90a or the second media disk 90b with a set of first media segments 92a, 92b disposed in a first annular ring about a peripheral edge thereabout, and with a set of second media segments 93a, 93b disposed in a second annular ring about the first media segments 92a, 92b, and with each of the two annular rings of the media segments 92a, 92b, 93a, 93b attached to a corresponding one of the first media disk 90a or the second media disk 90b.

Figure 12A:
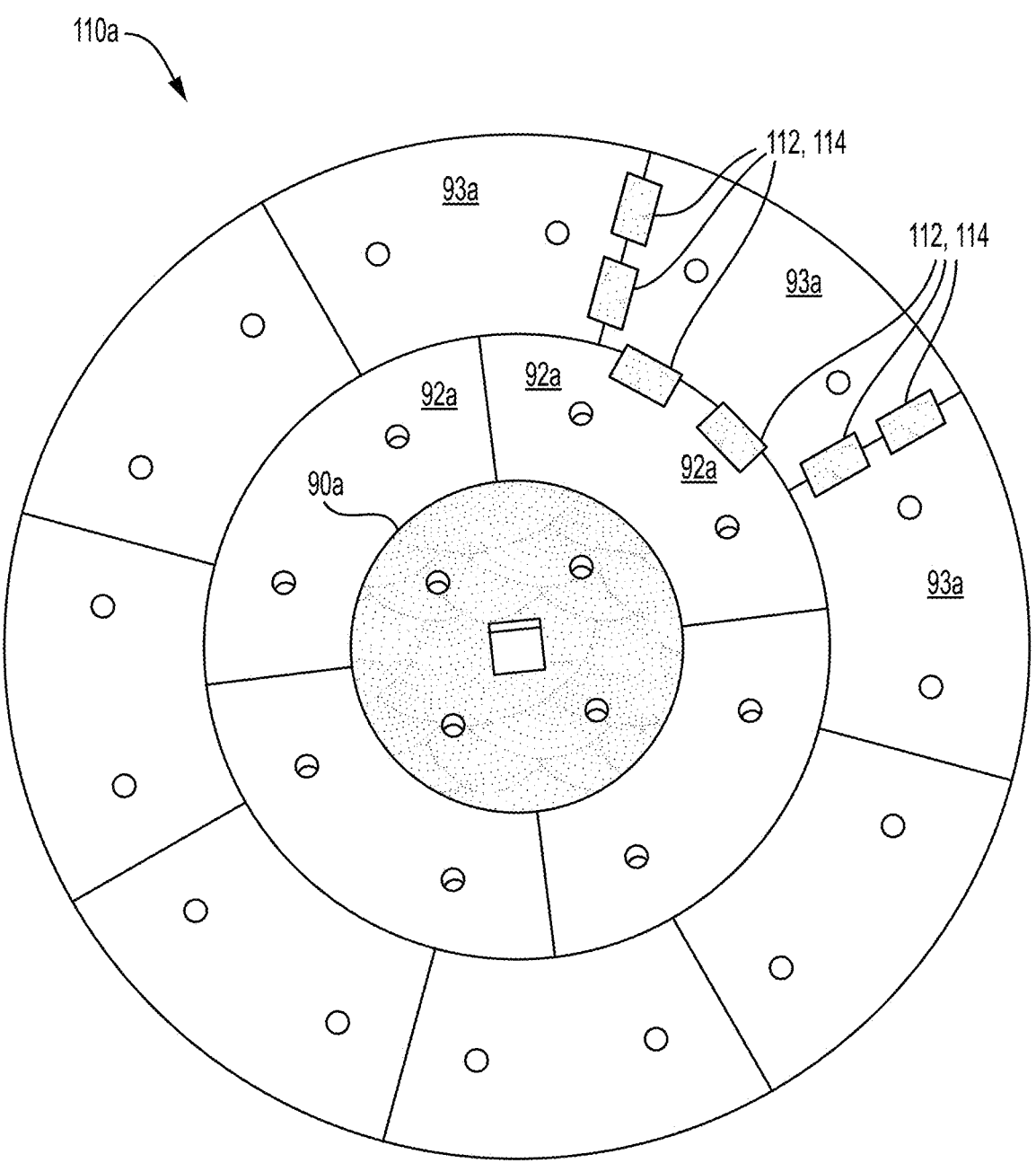
FIG. 12A shows the first disk assembly, with a partial transparency to illustrate recesses and tabs for interconnecting the media segments with one another and with a first media disk.

As also shown in FIGS. 10-11, each of the media segments 92a, 92b, 93a, 93b also includes grommets 98 configured to receive corresponding load transfer rods 99. The load transfer rods 99 extend through the holes in the grommets 98 and connect at the end plates 122. The number of load transfer rods 99 and holes in the media disk assembly 110a, 110b can vary based on overall system performance requirements Media Slip Plane Tab FIG. 12A shows the first media disk assembly 110a, with a partial transparency to illustrate tabs 112 and recesses 114 for interconnecting the media segments 92a, 93a, with one another and with the first media disk 90a. The second media disk assembly 110b may include similar tabs 112 and recesses 114. For simplicity of the description, tabs 112 and recesses 114 are only illustrated for one of the second media segments 93a. However, each of the media segments 92a, 93a to provide interconnection with one another and with the first media disk 90a. In some embodiments, a single edge of each of the media segments 92a, 93a may define one or more tabs 112 that protrude outwardly from the edge, and one or more recesses 114 configured to receive a corresponding tab 112 of a next adjacent one of the media segments 92a, 93a.

Figures 12B, 12C:
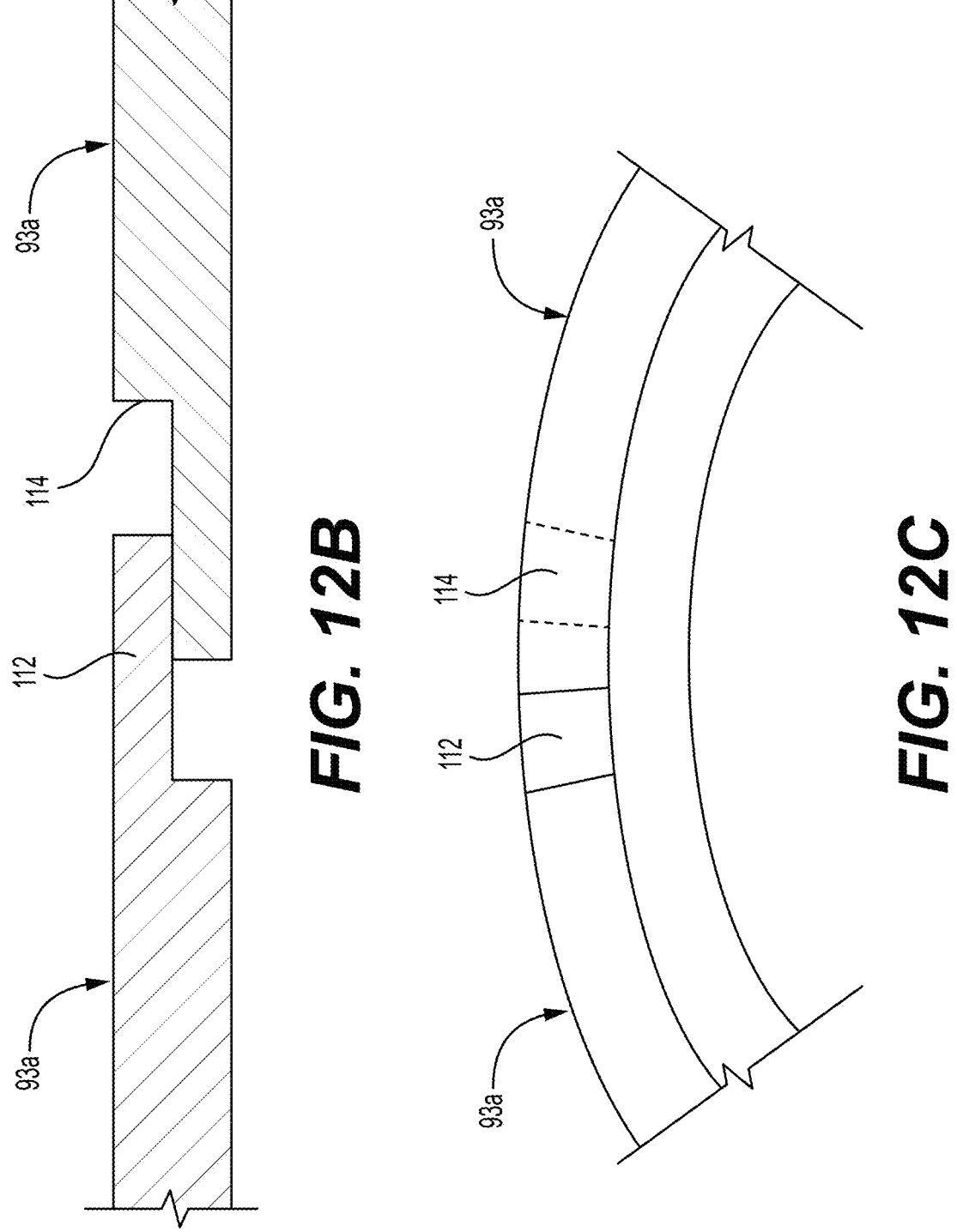
FIG. 12B shows an edge view of an interconnection between a recess and a tab interconnecting two of the media segments.
FIG. 12C shows a side view of an interconnection between a recess and a tab interconnecting two of the media segments.

FIG. 12B shows an edge view of an interconnection between a tab 112 and a recess 114 interconnecting two of the second media segments 93a; and FIG. 12C shows a side view of an interconnection between a tab 112 and a recess 114 interconnecting two of the second media segments 93a.

As shown, the interconnection between a tab 112 and a recess 114 may define a half-lap joint with the tab 112 only partially filling the recess 114 to provide space for expansion. However, the interconnection may take other forms, such as, for example, with one or more of the recesses 114 defining a pocket that completely surrounds at least a part of a corresponding one of the tabs 112.

The tab 112 and recess 114 interconnection between the media segments 92a, 93a may serve several functions. It may function to maintain position and contact between media disk segments as the segments flex during rotation. It can compensate for tolerance variations between disks. It may compensates for expansion/contraction of media disks with temperature change. The tabs 112 and recesses 114 may each be structural components of the media segments 92a, 93a, which may be integrally formed therewith (e.g. by being molded directly therewith).

Figure 13:
FIG. 13 shows a sectional side view illustrating components within a rotating biological contactor apparatus, in accordance with the present disclosure.

FIG. 13 shows a sectional side view illustrating components within the RBC apparatus 20, in accordance with the present disclosure. As shown, each of the media groups 56a, 56b, 56c includes the first media disks 90a held between two end plates 122 and attached thereto by load transfer fasteners 124. The end plates 122 may be spaced apart from one-another by a same spacing for each of the media groups 56a, 56b, 56c. Spacers 120 may be used to accommodate media groups 56a, 56b, 56c having fewer than a full set of the first media disks 90a.

Figure 14:
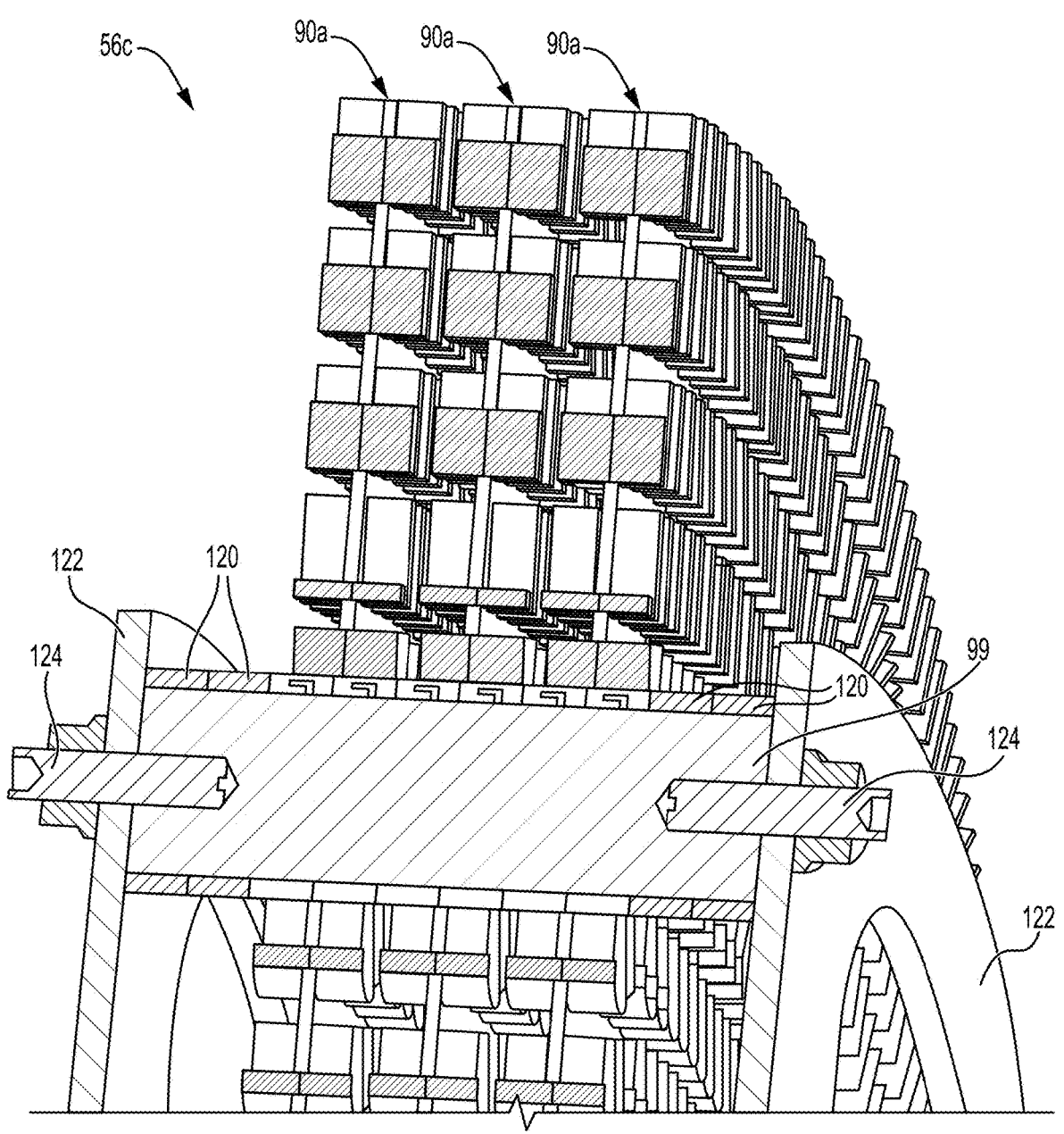
FIG. 14 shows an enlarged sectional perspective view of a media group including three of the first media disks.
Figure 15:
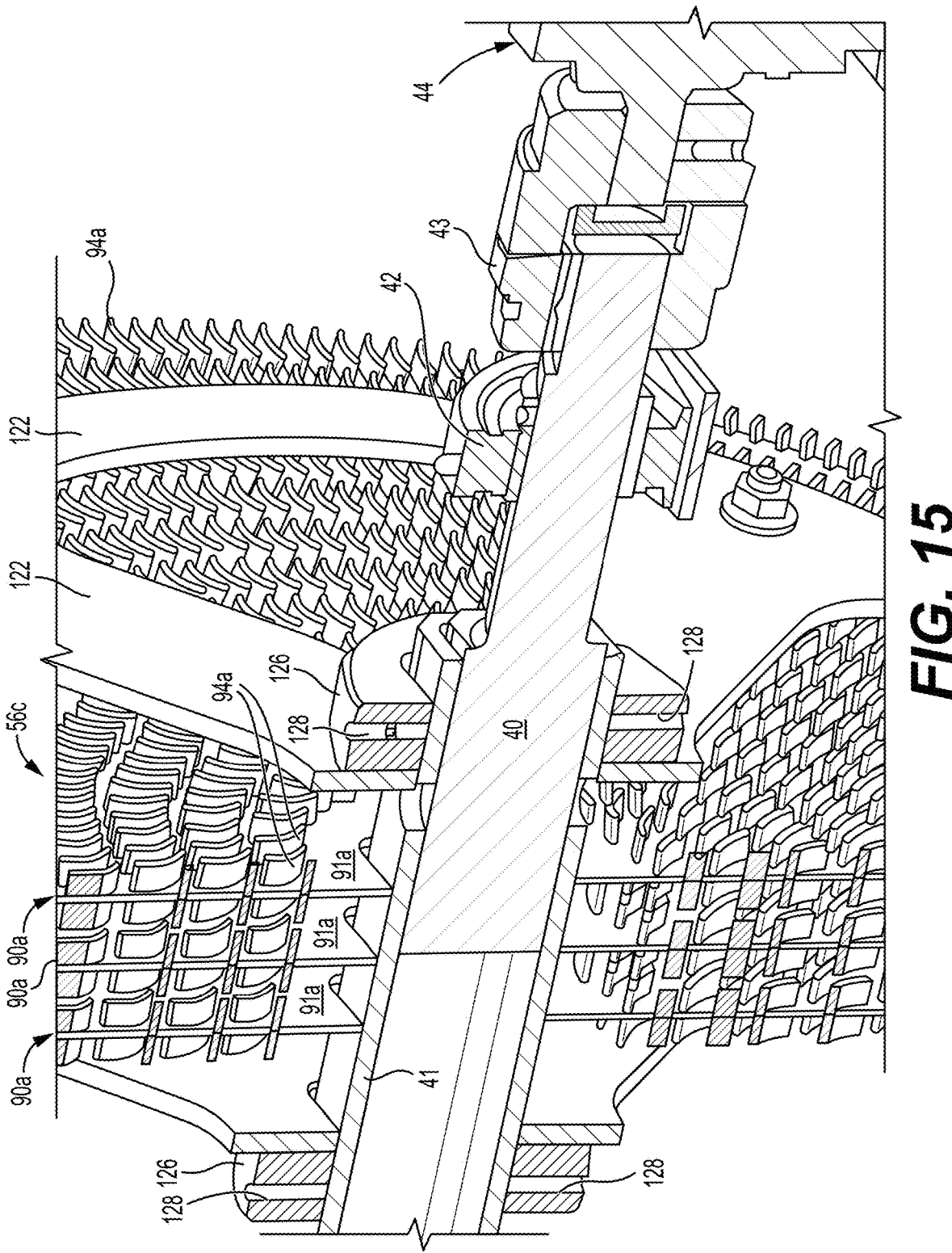
FIG. 15 shows another enlarged sectional perspective view of the media group including three of the first media disks attached to a drive shaft assembly.

FIGS. 14-15 show the second media group 56b including four of the first media disks 90a, with a load transfer rod 99 extending therethrough and attached to an end plate 122 on each side thereof, using the load transfer fasteners 124. As shown in FIG. 14, spacers 120 can be added or removed to maintain design commonality (e.g. to accommodate different numbers of the first media disks 90a on a load transfer rod 99. As shown in FIG. 15, the end plates 122 are held to the square tube 41 of the drive shaft 40 by hubs 126 having two screw bores 128 on opposite sides thereof and each configured to receive a setscrew (not shown on the FIGS.). These two setscrews provide redundancy in securing the end plates 122 on the drive shaft 40.

The structure of the drive shaft 40, end plates 122, and load transfer rods 99 may function together as a load transfer system to support a plurality of the media disk assemblies 110a, 110b, thereby providing media surface area on which to grow a large healthy biomass and control the rotational speed of the drive shaft 40.

Shaft/Load Transfer Mechanism

Figure 16:
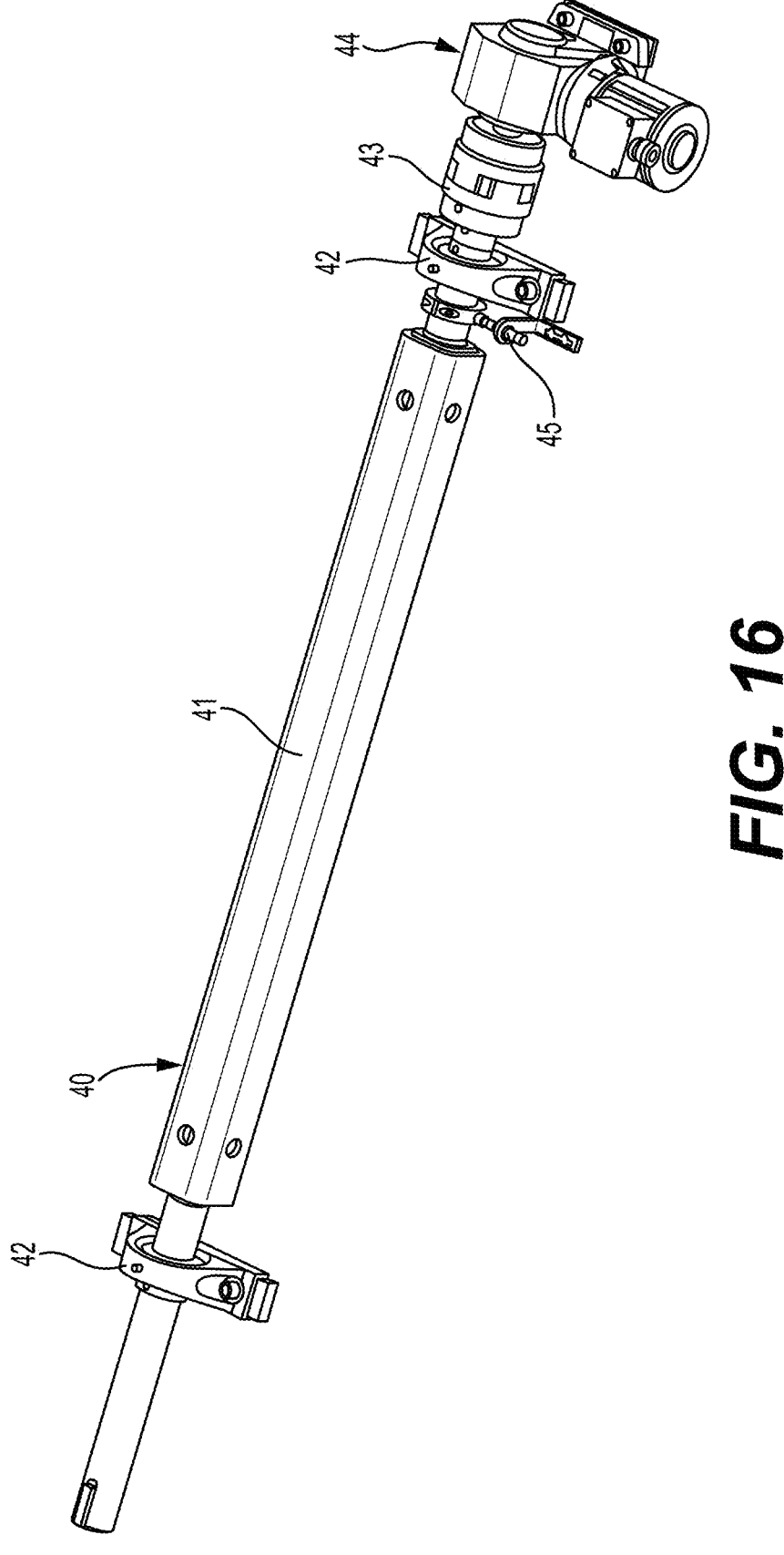
FIG. 16 shows a drive shaft assembly of the rotating biological contactor apparatus of the present disclosure.

FIG. 16 shows a drive shaft assembly of the RBC apparatus 20 of the present disclosure. As shown, the drive shaft assembly includes a drive shaft 40, including a square tube

41, and supported by two bearings 42, such as pillow bearings. FIG. 16 also shows the motor 44 attached to the drive shaft 40, with the coupling 43 connecting the motor 44 to the drive shaft 40. A speed sensor 45 monitors a rotational speed of the drive shaft 40. A controller (not shown) may monitor the speed sensor 45 for errors, such as a stopping or slowing of the drive shaft 40, which may be caused by the RBC apparatus 20 being overloaded, bound-up, or otherwise prevented from rotating at a design speed.

In some embodiments, multiple drive shafts 40 may be connected together to be driven by a single motor 44 and for operating two or more RBC apparatuses 20, each having a corresponding biozone tank 26.

Figure 17:
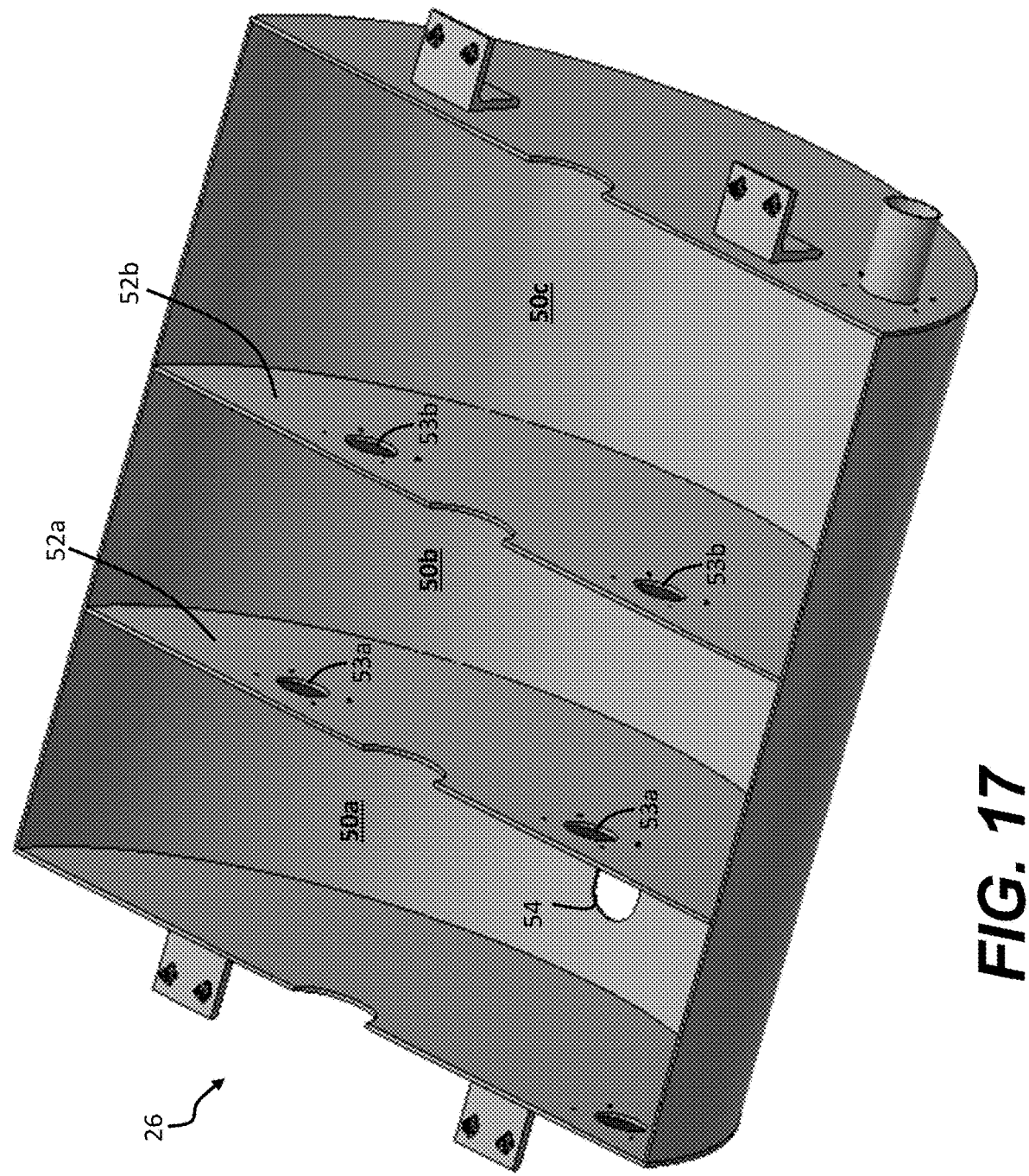
FIG. 17 shows a perspective view of a biozone tank of the rotating biological contactor apparatus of the present disclosure.
Figure 18:
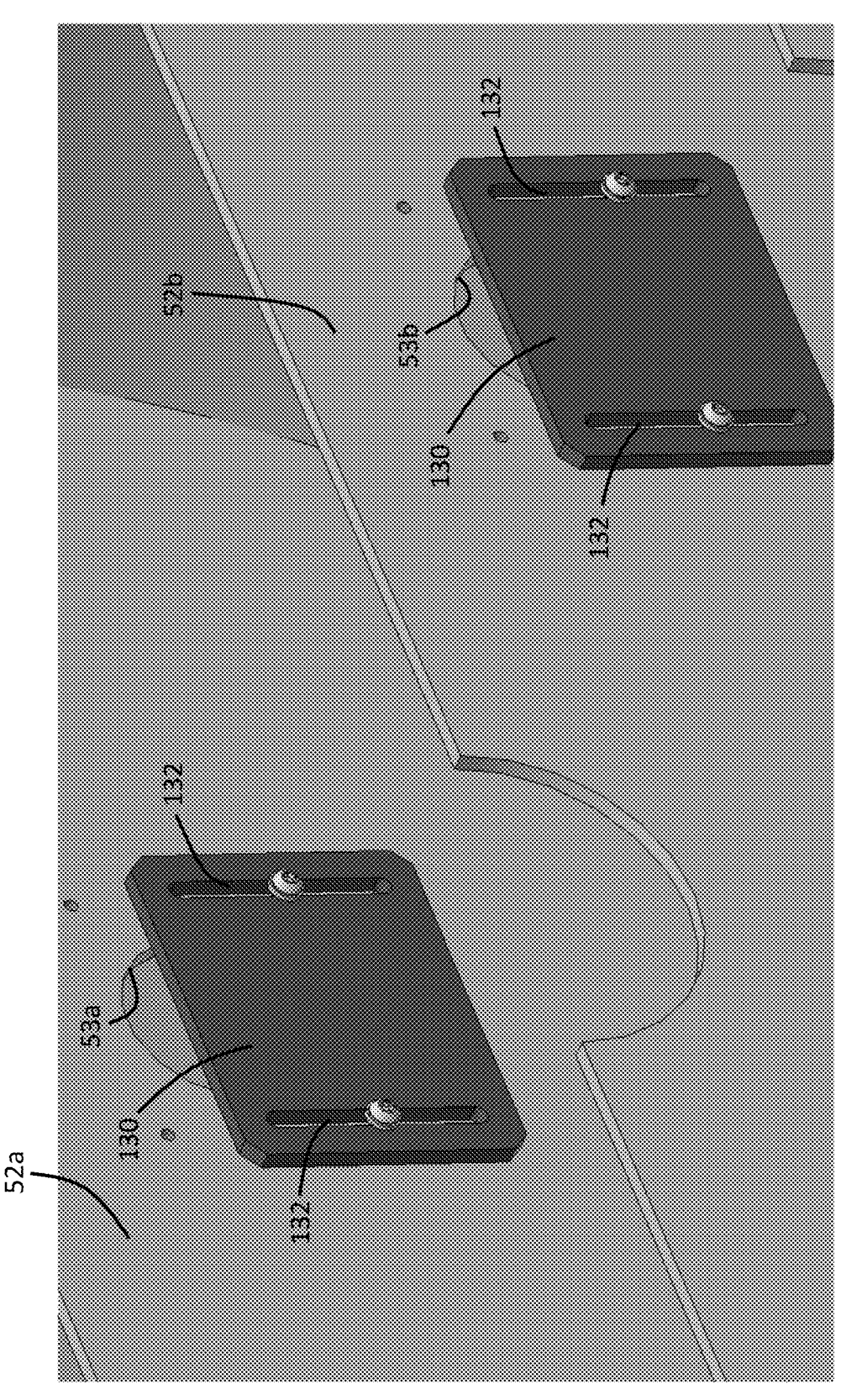
FIG. 18 shows a perspective sectional view of two partitions of the biozone tank of FIG. 17.

FIG. 17 shows a perspective view of a biozone tank 26 of the RBC apparatus 20 of the present disclosure. The biozone tank 26 may be made of Steel or Plastic, although other materials may be used. FIG. 18 shows a perspective sectional view of two partitions 52a, 52b of the biozone tank 26. The partitions 52a, 52b each define corresponding level flow holes 53a, 53b for water to flow between the subsections 50a, 50b, 50c at a controlled rate. The partitions 52a, 52b each also include shutters 130 configured to, at least partially cover corresponding ones of the level flow holes 53a, 53b for regulating wastewater flow between the subsections 50a, 50b, 50c of the biozone tank 26, and thereby providing a serpentine flow through the biozone tank 26. The shutters 130 each define two slots 132 for receiving a fastener and for providing a degree of adjustment that the shutter 130 blocks or covers the corresponding one of the level flow holes 53a, 53b. By adjusting the positioning of the shutters 130, flow between the subsections 50a, 50b, 50c of the biozone tank 26 can be fine-tuned.

Figures 19, 20:
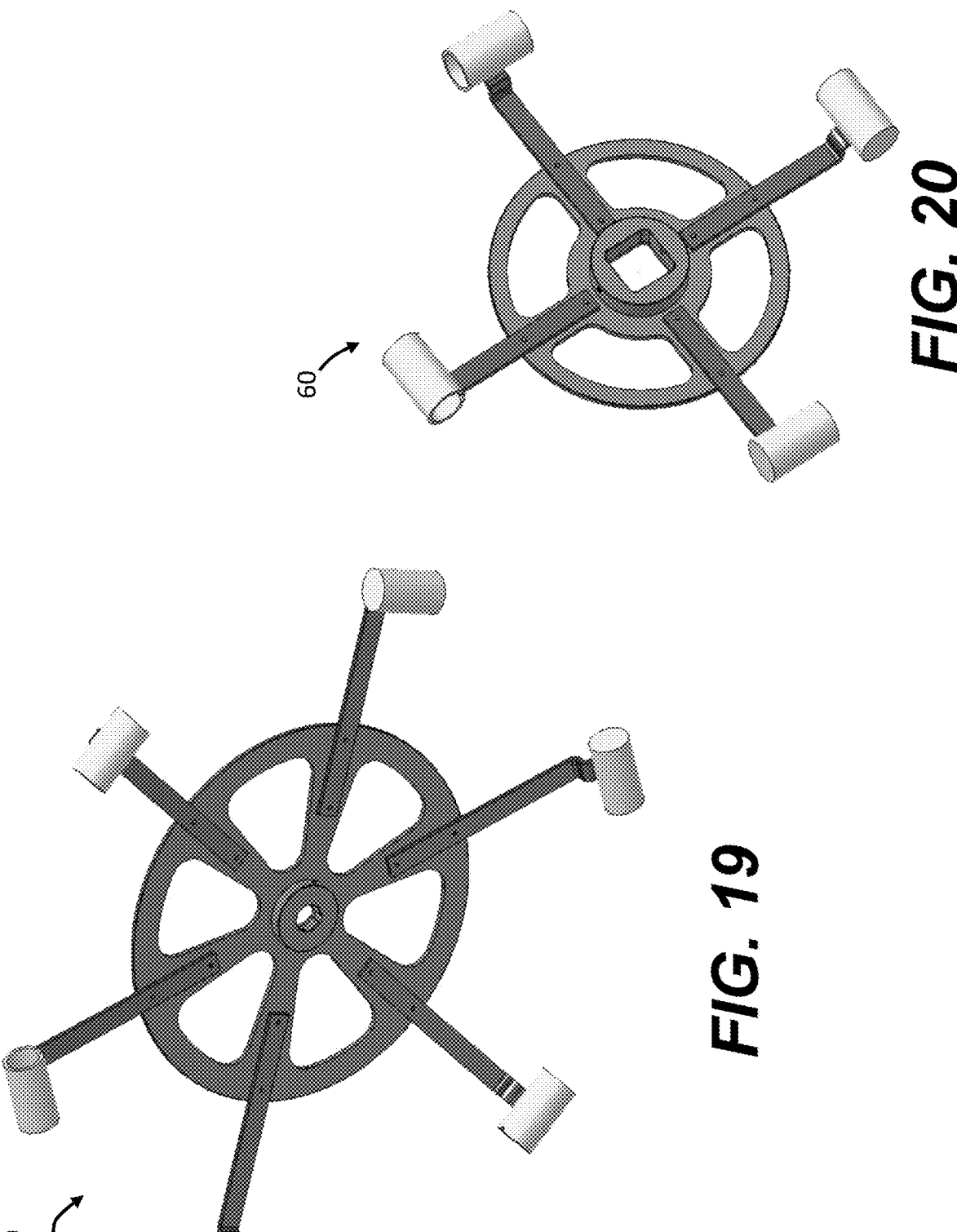
FIG. 19 shows a perspective view of a first waterwheel of the wastewater treatment system.
FIG. 20 shows a perspective view of a second waterwheel of the wastewater treatment system.

FIG. 19 shows a perspective view of the first waterwheel 30 of the wastewater treatment system 10. The first waterwheel 30 may also be called a transfer waterwheel or a metering waterwheel. FIG. 20 shows a perspective view of the second waterwheel 60 of the wastewater treatment system 10. The second waterwheel 60 may also be called a recirculation waterwheel. Either or both of the waterwheels 30, 60 may have a welded construction of steel and/or aluminum. Either or both of the waterwheels 30, 60 may include a Plate with Welded Lug & Keyway for Drive Shaft Attachment. The number and/or size of transfer cups of each of the waterwheels 30, 60 may be determined based on various design requirements, such as system capacity requirements.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A media disk for a rotating biological contactor apparatus, comprising:

a substrate having a disk shape defining a first surface and a second surface opposite the first surface, the substrate configured to be attached to a drive shaft and to rotate therewith; and a plurality of fins protruding from at least one of the first surface and the second surface of the substrate and extending for a length in a radial direction to retain a biomass thereupon, wherein the plurality of fins are arranged in a plurality of concentric rings on the at least one of the first surface and the second surface of the substrate, and wherein, when the media disk is rotated, the plurality of fins of the plurality of concentric rings are configured to direct fluid flow radially inwardly toward a center of the media disk, thereby increasing surface area for oxygen transfer and lengthening contact time between oxygenated water and the biomass.

2. The media disk of claim 1, wherein the at least one of the first surface and the second surface of the substrate is flat.

3. The media disk of claim 1, wherein the at least one of the first surface and the second surface of the substrate is corrugated.

4. The media disk of claim 1, wherein the plurality of fins are integrally molded with the substrate.

5. The media disk of claim 1, wherein the plurality of fins each define an arcuate cross-section, with ends thereof configured to enter the liquid surface before a central portion thereof.

6. The media disk of claim 1, wherein the plurality of fins each define a substantially constant cross-section along a height direction generally perpendicular to the at least one of the first surface and the second surface of the substrate.

7. The media disk of claim 1, wherein the plurality of fins protrude from both of the first surface and the second surface of the substrate.

8. The media disk of claim 1, further comprising a grommet protruding from the substrate and beyond a height of the plurality of fins, the grommet configured to provide an even spacing between the media disk and a next adjacent disk attached to the drive shaft.

9. The media disk of claim 8, wherein the grommet has a tubular shape for receiving a load transfer rod therethrough.

10. The media disk of claim 1, further comprising a plurality of media segments disposed annularly about the substrate and attached to rotate therewith.

11. The media disk of claim 10, wherein at least one of the media segments or the substrate defines a recess configured to receive a tab of another one of the media segments or the substrate for interconnecting the media segments with one another and with the substrate, and to compensate for expansion and contraction between the media segments.

12. The media disk of claim 10, wherein the plurality of media segments includes:

a plurality of first media segments disposed annularly about and adjacent to a peripheral edge of the substrate; and a plurality of second media segments disposed annularly about the plurality of first media segments.

13. A rotating biological contactor apparatus, comprising:

a biozone tank containing a liquid being treated;

a drive shaft that is driven to rotate; and at least one of the media disk of claim 1 attached to the drive shaft to rotate therewith.

14. The media disk of claim 1, wherein the substrate defines a plurality of passage holes between the plurality of concentric rings, and wherein the plurality of passage holes define a swept arc shape following a helix pattern from an outer diameter toward a center of the media disk.

* * * * *